US008861013B2

(12) United States Patent
Hara

(10) Patent No.: US 8,861,013 B2
(45) Date of Patent: Oct. 14, 2014

(54) IMAGE FORMING APPARATUS

(71) Applicant: Hiroyuki Hara, Osaka (JP)

(72) Inventor: Hiroyuki Hara, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 14/076,221

(22) Filed: Nov. 10, 2013

(65) Prior Publication Data
US 2014/0063554 A1 Mar. 6, 2014

Related U.S. Application Data

(62) Division of application No. 12/124,538, filed on May 21, 2008, now Pat. No. 8,619,310.

(30) Foreign Application Priority Data

| May 25, 2007 | (JP) | 2007-139094 |
| May 25, 2007 | (JP) | 2007-139095 |
| May 25, 2007 | (JP) | 2007-139096 |
| May 25, 2007 | (JP) | 2007-139097 |
| Nov. 8, 2007 | (JP) | 2007-290332 |

(51) Int. Cl.
G06K 15/00 (2006.01)
G06K 15/02 (2006.01)

(52) U.S. Cl.
CPC .............. *G06K 15/181* (2013.01); *G06K 15/02* (2013.01); *G06K 15/1827* (2013.01)
USPC ......... 358/1.16; 358/1.17; 707/820; 711/171; 711/172; 711/173

(58) Field of Classification Search
USPC .............. 358/1.13, 1.15, 1.16, 1.17; 707/813, 707/814, 815, 819, 820; 711/6, 100, 101, 711/170, 171, 172, 173
See application file for complete search history.

Primary Examiner — Vu B Hang

(57) ABSTRACT

A CPU perform the steps of:
(a) causing a compression/decompression processor to decompress the compressed data of one of three bands in the data area except for the first block in the band, and storing decompressed bitmap data in the data area;
(b) rasterizing each of the intermediate data blocks in the band and synthesizing the rasterized data and the decompressed bitmap data in the band; and
(c) causing the compression/decompression processor to compress the synthesized bitmap data and storing the compressed data in the data area.

The CPU performs the steps (a) to (c) in different respective tasks in parallel, and performs the steps (a) to (c) along the order of (a), (b), (c) for each of the intermediate code blocks in each of the bands while using the 1st to the 3rd bitmap data area in turn for each of the steps (a) to (c).

10 Claims, 21 Drawing Sheets

IMAGE FORMING APPARATUS

CROSS-REFERENCE TO RELATED APPLICATIONS

This application is a divisional application of U.S. application Ser. No. 12/124,538, filed on May 21, 2008. That application relates to and claims priority rights from (1) Japanese Patent Application No. 2007-139095, filed on May 25, 2007, (2) Japanese Patent Application No. 2007-139097, filed on May 25, 2007, (3) Japanese Patent Application No. 2007-139094, filed on May 25, 2007, (4) Japanese Patent Application No. 2007-139096, filed on May 25, 2007, and Japanese Patent Application No. 2007-290332, filed on Nov. 8, 2007. The entire disclosures of those applications are hereby incorporated by reference herein.

BACKGROUND OF THE INVENTION

1. Field of the Invention

The present invention relates to image forming apparatuses that expand an intermediate code (e.g. a display list) to bitmap data and compress the bitmap data.

2. Description of the Related Art

Page printers tend to require larger memory size and longer processing time due to higher resolutions. Consequently, it is required to suppress memory size increase and to process at higher speed without complex software configuration in order to supply high-speed page printers at low price and shorten product development terms.

In a technique described in Japan Laid-Open Patent Application H04-088749, to reduce required memory size, one page of print data described in page description language is divided into blocks (e.g. 512 blocks), each block is transformed to an intermediate code and rasterized to generate bitmap data, and then the bitmap data are stored in a memory after the bitmap data are compressed. Further, in order to handle overlap of drawing objects, compressed data are decompressed, the decompressed bitmap data are synthesized with bitmap data generated by rasterization, and the synthesized data are stored in a memory after the synthesized data are compressed.

However, as described in Japan Laid-Open Patent Application H09-214709, when a RIP (Raster Image Processor) unit expands data on a new block to bitmap data, the RIP unit waits for finishing the process that synthesized data are compressed and stored in a memory and the compressed data on the new block are decompressed, and consequently processing is delayed.

Therefore, in a technique described in Japan Laid-Open Patent Application H09-214709, the RIP unit continuously rasterizes blocks to generate bitmap data in turn, compresses the bitmap data and stores the compressed data in a hard disk drive instead of a memory; then after expansion of one page of the bitmap data, for each block, parts of compressed data to be synthesized are read from the hard disk drive and decompressed, decompressed parts are synthesized in turn, and the synthesized data are stored in the memory. In addition, in a technique described in Japan Laid-Open Patent Application H10-289066, to process at high speed, a plural of hardware RIPs operate in parallel.

In case of using object oriented language such as C++ and Java®, dynamic allocation and release of an area in a heap memory are performed by the system (i.e. runtime library). If a required size of memory area can not be allocated, the objects that have not been referred are released by garbage collection and a continuous vacant area is generated by performing compaction.

However, since it takes long time to copy objects in compaction due to a large size of the heap memory and application can not project when garbage collection is performed, processing may be delayed unexpectedly. Therefore, in a technique described in Japan Laid-Open Patent Application 2006-344184, in image forming apparatuses, to reduce influence to printing process, garbage collection is performed in waiting time of print data transmitted from external devices.

SUMMARY OF THE INVENTION

According to Japan Laid-Open Patent Application H09-214709, a hard disk drive is used to store the compressed data temporarily, and the compression and the decompression are performed sequentially. As a result, speed-up of processing is interfered with. In Japan Laid-Open Patent Application H10-289066, there is not any disclosure of processing band by band to reduce a required memory size and compression/decompression of bitmap data.

Moreover, if a memory area can not be allocated when print data are required to be processed for printing immediately after the print data are received, garbage collection occurs and the processing is delayed. Generally, during garbage collection, other processes are interrupted. Therefore, if garbage collection occurs frequently, processing is delayed for a long time.

In view of this circumstance, it is an object of the present invention to provide an image forming apparatus capable of reducing a required memory size and converting print data to bitmap data at high speed, and an image forming apparatus capable of reducing a delay on heap memory allocation.

The present invention solves the subject as follows.

In the first aspect of the present invention, an image forming apparatus comprises a CPU that executes a program; a memory device in which a data area is reserved, the memory device is connected to the CPU; and a compression/decompression processor that compresses the bitmap data and decompresses compressed data of the bitmap data, the compression/decompression processor is capable of compressing and decompressing in parallel. The data area has a first bitmap data area, a second bitmap data area and a third bitmap data area. Each of the first, the second and the third bitmap data areas has a size of one band. The CPU executes the program, for three bands of the bands along the order of the bands and the blocks, to perform the steps of:

(a) causing the compression/decompression processor to decompress compressed data of one of the three bands in the data area except for the first block in the band, and storing decompressed bitmap data in the data area;

(b) rasterizing each of the intermediate data blocks in the band and synthesizing the rasterized data and the decompressed bitmap data in the band; and (c) causing the compression/decompression processor to compress the synthesized bitmap data and storing the compressed data in the data area.

According to the program, the CPU performs the steps (a), (b) and (c) in different respective tasks in parallel, and performs the steps (a), (b) and (c) along the order of (a), (b), (c) for each of the intermediate code blocks in each of the bands while using the first, the second and the third bitmap data area in turn for each of the steps (a), (b) and (c).

In the second aspect of the present invention, in the image forming apparatus of the first aspect, the CPU, in the step (b), before rasterizing, transforms a part or all of the print data on the corresponding band in the data area to intermediate code blocks, and stores the intermediate code blocks in the data area.

In the third aspect of the present invention, in the image forming apparatus of the second aspect, for each of the steps (a), (b) and (c), a band identification code and a block identification code are stored in the data area for identifying a band and a block processed currently. According to the program, the CPU updates the band identification code and the block identification code when each of the steps (a), (b) and (c) is finished on each of the first, the second and the third bitmap data area, and performs the steps (a), (b) and (c) of a block in a band identified with the value of the band identification code and the block identification code along the order of (a), (b), (c).

In the fourth aspect of the present invention, in the image forming apparatus of the first aspect, the CPU performs the step of: (d) transforming the print data of each band into intermediate code blocks and storing the intermediate code blocks in the data area, and the CPU performs the steps (b) and (d) in different tasks in parallel.

In the fifth aspect of the present invention, in the image forming apparatus of the fourth aspect, for each of the steps (a), (b), (c) and (d), a band identification code and a block identification code are stored in the data area for identifying a band and a block processed currently. According to the program, the CPU updates the band identification code and the block identification code when each of the steps (a), (b), (c) and (d) is finished on each of the first, the second and the third bitmap data area, and performs the steps (a), (b) and (c) of a block in a band identified with the value of the band identification code and the block identification code along the order of (a), (b), (c).

According to the first aspect, since the bitmap data area is required for only three bands, a required memory size can be reduced, and since decompression, rasterization and compression are performed in different tasks in parallel, each of compression and decompression easily comes to be performed relatively continuously and print data can be converted to bitmap data at high speed. This contributes to reduce the development term and to simplify design change.

According to the second aspect, since generating an intermediate code (e.g. a display list) and rasterizing can be performed alternately in one task, it is not required to notify process completion from one to the other.

According to the third or fifth aspect, referring to the band identification code and the block identification code, for one band, it is easy to keep the rule that rasterization must be performed after decompression is finished, compression must be performed after rasterization is finished and decompression must be performed after compression is finished.

According to the fourth aspect, since generating an intermediate code (e.g. a display list) and rasterization are performed in parallel, each process of generating an intermediate code and rasterization can be simplified, and since the time required to rasterize is relatively shorter than idle time of rasterization, a delay due to switching between generating an intermediate code (e.g. a display list) and rasterization is reduced in time divisional parallel processing.

Further, in the sixth aspect of the present invention, an image forming apparatus comprises a CPU that executes a program; a memory device in which a data area is reserved, the memory device is connected to the CPU; a compression/decompression processor that compresses the bitmap data and decompresses compressed data of the bitmap data, the compression/decompression processor is capable of compressing and decompressing in parallel; and a print engine controller which is connected to the CPU. The CPU executes the program to perform the steps of:

(a) transforming each of the bands to intermediate code blocks, and storing the intermediate code blocks in the data area;

(b) along the order of the blocks on each of the bands, (b1) causing the compression/decompression processor to decompress compressed data in the data area except for the first block in the band, and storing decompressed bitmap data in the data area;

(b2) rasterizing each of the intermediate data blocks in the band and synthesizing the rasterized data and the decompressed bitmap data in the band; and (b3) causing the compression/decompression processor to compress the synthesized bitmap data and storing the compressed data in the data area; and (c) transmitting to the print engine controller either one page of the compressed data in the step (b) or one page of the bitmap data generated by decompressing the compressed data with the compression/decompression processor, and the CPU performs the steps (b) and (c) in parallel.

In the seventh aspect of the present invention, in the image forming apparatus of the sixth aspect, the compression/decompression processor is an ASIC connected to the CPU and has a first decompression unit and a second decompression unit which are capable of operating in parallel, and the first decompression unit is used in the step (b1) and the second decompression unit is used in the step (c).

In the eighth aspect of the present invention, in the image forming apparatus of the seventh aspect, the data area has a first bitmap data area, a second bitmap data area and a third bitmap data area. Each of the first, the second and the third bitmap data areas has a size of one band. The CPU performs the steps (b1), (b2), (b3) and (c) in different respective tasks in parallel, and performs the steps (b1), (b2) and (b3) along the order of (b1), (b2), (b3) for each of the intermediate code blocks in each of the bands while using the first, the second and the third bitmap data area in turn for each of the steps (b1), (b2) and (b3).

In the ninth aspect of the present invention, in the image forming apparatus of the eighth aspect, the CPU performs the step (a) in another task in parallel with the tasks of the steps (b1), (b2), (b3) and (c).

In the tenth aspect of the present invention, in the image forming apparatus of the seventh aspect, the data area has a first bitmap data area, a second bitmap data area and a third bitmap data area. Each of the first, the second and the third bitmap data areas has a size of one band. The CPU performs the steps (b1), (b2) and (b3) of the first, the second and the third bitmap data area for every three bands in a first task, a second task and a third task respectively, the steps (b1), (b2) and (b3) are performed along the order of the bands and the blocks. The first, the second and the third tasks are performed in parallel without performing the steps (b1) and (b3) in parallel in the first, the second and the third tasks.

In the eleventh aspect of the present invention, in the image forming apparatus of the tenth aspect, the CPU performs the step (a) in another task in parallel with the first, the second and the third tasks.

According to the sixth aspect, since the steps (b) and (c) are performed in parallel by the compression/decompression processor, the data are supplied to the print engine controller efficiently, and a required memory size can be reduced and print data can be converted to bitmap data at high speed.

According to the sixth aspect, since the first and the second decompression units capable of operating in parallel are used in the steps (b1) and (c) respectively, time divisional parallel processing is not required in the decompression and therefore the merit mentioned above is emphasized.

According to the eighth aspect, since the bitmap data area is required for only three bands, a required memory size can be reduced, and since decompression, rasterization and compression are performed in different tasks in parallel, each of compression and decompression easily comes to be performed relatively continuously and print data can be converted to bitmap data at high speed. This contributes to reduce the development term and to simplify design change.

According to the ninth aspect, since the step (a) is performed in another task in parallel with the tasks of the steps (b1), (b2), (b3) and (c), program configuration can be simplified.

According to the tenth aspect, since the bitmap data area is required for only three bands, a required memory size can be reduced. Further, since for one band, decompression, rasterization and compression are performed in one task sequentially, synchronization between tasks is not required and each of compression and decompression easily comes to be performed relatively continuously for three bands and consequently print data can be converted to bitmap data at high speed. This contributes to reduce the development term and to simplify design change. Furthermore, common functions can be used for the first, the second and the third tasks, so that memory usage can be reduced.

According to the eleventh aspect, since intermediate codes (e.g. display lists) for rasterization in the first, the second and the third tasks are generated in a fourth task in parallel with the first, the second and the third tasks, processes are performed efficiently due to a shorter delay than that in case of generating the intermediate code in each of the first, the second and the third tasks.

Further, in the twelfth aspect of the present invention, an image forming apparatus comprises a CPU that executes a program; a memory device in which a data area is reserved, the memory device is connected to the CPU; and a compression/decompression processor that compresses the bitmap data and decompresses compressed data of the bitmap data, the compression/decompression processor is capable of compressing and decompressing in parallel. The data area has a first bitmap data area, a second bitmap data area and a third bitmap data area. Each of the first, the second and the third bitmap data areas has a size of one band. The CPU executes the program to perform, for each band of bands that one page of print data described in page description language is divided to, the steps of:

(a) transforming each of the bands to intermediate code blocks, and storing the intermediate code blocks in the data area;

(b) causing the compression/decompression processor to decompress compressed data of one of the three bands in the data area except for the first block in the band, and storing decompressed bitmap data in the data area;

(c) rasterizing each of the intermediate data blocks in the band and synthesizing the rasterized data and the decompressed bitmap data in the band; and (d) causing the compression/decompression processor to compress the synthesized bitmap data and storing the compressed data in the data area.

According to the program, the CPU performs the steps (b), (c) and (d) in turn on each of the first, the second and the third bitmap data areas while shifting the steps on the bitmap data areas relative to each other so that the same step is not performed in the same time on the first, the second and the third bitmap data areas.

In the thirteenth aspect of the present invention, in the image forming apparatus of the twelfth aspect, the CPU performs the step (a) and the step (c) alternately.

In the fourteenth aspect of the present invention, in the image forming apparatus of the thirteenth aspect, for each of the steps (b), (c) and (d), a band identification code and a block identification code are stored in the data area for identifying a band and a block processed currently. According to the program, the CPU updates the band identification code and the block identification code when each of the steps (b), (c) and (d) is finished on each of the first, the second and the third bitmap data area, and performs the steps (b), (c) and (d) of a block in a band identified with the value of the band identification code and the block identification code along the order of (b), (c), (d).

In the fifteenth aspect of the present invention, in the image forming apparatus of the twelfth aspect, the CPU performs the steps (a) and (c) in parallel.

In the sixteenth aspect of the present invention, in the image forming apparatus of the fifteenth aspect, for each of the steps (a), (b), (c) and (d), a band identification code and a block identification code are stored in the data area for identifying a band and a block processed currently. According to the program, the CPU updates the band identification code and the block identification code when each of the steps (a), (b), (c) and (d) is finished on each of the first, the second and the third bitmap data area, and performs the steps (b), (c) and (d) of a block in a band identified with the value of the band identification code and the block identification code along the order of (b), (c), (d).

According to the twelfth aspect, since the bitmap data area is required for only three bands, a required memory size can be reduced, and since decompression, rasterization and compression for three bands are shifted relative to each other and performed in parallel, each of compression and decompression easily comes to be performed relatively continuously and print data can be converted to bitmap data at high speed.

According to the thirteenth aspect, since generating an intermediate code (e.g. a display list) and rasterizing can be performed alternately in one task, it is not required to notify process completion from one to the other.

According to the fourteenth or the sixteenth aspect, by referring to the band identification code and the block identification code, for one band, it is easy to keep the rule that rasterization must be performed after decompression is finished, compression must be performed after rasterization is finished and decompression must be performed after compression is finished.

According to the fourteenth or the sixteenth aspect, since generating an intermediate code (e.g. a display list) and rasterization are performed in parallel, each process of generating an intermediate code and rasterization can be simplified, and since the time required to rasterize is relatively shorter than idle time of rasterization, a delay due to switching between generating an intermediate code (e.g. a display list) and rasterization is reduced in time divisional parallel processing.

Further, in the seventeenth aspect of the present invention, an image forming apparatus comprises a CPU that executes a program; a memory device in which a data area is reserved, the memory device is connected to the CPU; and a compression/decompression processor that compresses the bitmap data and decompresses compressed data of the bitmap data, the compression/decompression processor is capable of compressing and decompressing in parallel. The data area has a first bitmap data area, a second bitmap data area and a third bitmap data area. Each of the first, the second and the third bitmap data areas has a size of one band. The CPU executes the program, for three bands of the bands along the order of the bands and the blocks, to perform the steps of:

(a) causing the compression/decompression processor to decompress compressed data of one of the three bands in the data area except for the first block in the band, and storing decompressed bitmap data in one of the bitmap data areas;

(b) rasterizing each of the intermediate data blocks in the band and synthesizing the rasterized data and the decompressed bitmap data in the bitmap data area; and (c) causing the compression/decompression processor to compress the synthesized bitmap data in the bitmap data area and storing the compressed data in the bitmap data area.

According to the program, the CPU performs the steps on each of the first, the second and the third bitmap data areas in a first task, a second task and a third task respectively in parallel without performing the steps (a) and (c) in parallel in the first, the second and the third tasks.

In the eighteenth aspect of the present invention, in the image forming apparatus of the seventeenth aspect, according to the program, in a fourth task, the CPU performs the step of: (d) transforming the print data of each band into the intermediate code blocks and storing the intermediate code blocks in the data area, and the CPU performs the fourth task in parallel with the first, the second and the third tasks.

In the nineteenth aspect of the present invention, in the image forming apparatus of the eighteenth aspect, information indicating whether each of the steps (a) and (c) is finished or not is stored in the data area for each of the first, the second and the third bitmap data area, and according to the program, the CPU updates the information at the time when any of the steps (a) and (c) is finished on each of the first, the second and the third bitmap data areas and by using the information, prevents from performing the steps (a) and (c) in parallel on the first, the second and the third bitmap data areas.

According to the seventeenth aspect, since the bitmap data area is required for only three bands, a required memory size can be reduced. Further, since for one band, decompression, rasterization and compression are performed in one task sequentially, synchronization between tasks is not required and each of compression and decompression easily comes to be performed relatively continuously for three bands and consequently print data can be converted to bitmap data at high speed. This contributes to reduce the development term and to simplify design change. Furthermore, common functions can be used for the first, the second and the third tasks, so that memory usage can be reduced.

According to the eighteenth aspect, since intermediate codes (e.g. display lists) for rasterization in the first, the second and the third tasks are generated in a fourth task in parallel with the first, the second and the third tasks, processes are performed efficiently due to a shorter delay than that in case of generating the intermediate code in each of the first, the second and the third tasks.

According to the nineteenth aspect, synchronization among the first, the second and the third tasks can be kept easily.

Further, in the twentieth aspect of the present invention, an image forming apparatus comprises a processor that executes a heap memory allocation program; and a memory unit that a heap memory is allocated to, the memory unit is connected to the processor. The processor executes the heap memory allocation program to perform the steps of:

(a) determining whether a required size of memory area can be allocated or not and allocating the required size of memory area if the memory area can be allocated;

(b) when it is not determined that the memory area can be allocated, waiting for changing a status of the memory unit from a predetermined first status to a predetermined second status if a status of the memory unit is the first status and then performing the step (a) again when a status of the memory unit becomes the second status; and (c) in the step (b), if it is determined that a status of the memory unit is not the first status, allocating the required size of memory area after garbage collection is performed.

In the twenty first aspect of the present invention, in the image forming apparatus of the twentieth aspect, the first status is a status in which two or more pages of display list including a currently processed page remain on a memory, and the second status is a status in which only one or less page of display list including a currently processed page remains on a memory.

In the twenty second aspect of the present invention, in the image forming apparatus of the twenty first aspect, the processor, in the step (c), performs the steps of:

(c1) if a status of the memory unit is not the first status, determining whether only one or less page of display list including a currently processed page remains on a memory and the number of bands that have been generated of a display list currently processed is less than a value of a rasterization starting condition;

(c2) in the step (c1), if it is determined that only one or less page remains and the number of bands is less than the value, starting rasterization exceptionally and performing the step (a) again; and (c3) in the step (1, if it is not determined that only one or less page remains and the number of bands is less than the value, allocating the required size of memory area after garbage collection is performed.

In the twenty third aspect of the present invention, in the image forming apparatus of the twenty second aspect, the processor, in the step (c3), performs the steps of:

(c31) determining whether a request to allocate the memory area came from a program performing a process before generating the display list, and if it is determined that the request came from the program, releasing a font cache and performing the step (a) again;

(c32) in the step (c31), if it is not determined that the request came from the program, allocating the required size of memory area after garbage collection is performed.

In the twenty fourth aspect of the present invention, an image forming apparatus comprises a processor that executes a heap memory management program and processing programs; and a memory unit that a heap memory is allocated to, the memory unit is connected to the processor. The processing programs are executed in different respective tasks. The heap memory management program has a heap memory allocation program executed in a task other than the tasks of the processing programs and a heap memory release program capable of being executed in parallel with the heap memory allocation program. According to each of the processing programs, the processor locks a semaphore designated to a task of the processing program in preprocessing before executing the processing program and releases the semaphore in postprocessing after executing the processing program. According to the heap memory allocation program, when the processor determines that a required size of memory area can not be allocated, the processor locks semaphores for the respective processing programs in preprocessing of garbage collection, then performs the garbage collection, and releases the semaphores in postprocessing of the garbage collection. According to the heap memory release program, the processor releases a memory area in the heap memory, the memory area is assigned by a release request from one of the processing programs. Each of the processing programs releases the semaphore of itself before requesting heap memory allocation to the processor via the heap memory allocation program and locks the semaphore after executing the heap memory allocation program.

According to the twentieth aspect, since it is determined whether a required size of memory area can be allocated or not after changing from the first status to the second status and then garbage collection is performed if it can not be allocated, frequency of garbage collection can be reduced and consequently can be reduced a delay on heap memory allocation.

According to the twenty first aspect, since the first status is a status in which two or more pages of display list including a currently processed page remain on a memory, and the second status is a status in which only one or less page of display list including a currently processed page remains on a memory, frequency of garbage collection can be reduced effectively and consequently it is possible to reduce a delay on heap memory allocation.

According to the twenty second aspect, even though a status of the memory unit is not the first status, if it is determined that only one or less page of display list remains and the number of bands that have been generated of a display list is less than the value of a rasterization starting value, rasterization is started exceptionally and it is waited that a required size of memory area becomes available, and consequently frequency of garbage collection can be reduced more effectively and it is possible to reduce a delay on heap memory allocation.

According to the twenty third aspect, if it is determined that the request to allocate the memory area came from the program performing a process before generating the display list, it is determined whether a required size of memory area can be allocated or not after releasing a font cache, and therefore frequency of garbage collection can be reduced more effectively and consequently it is possible to reduce a delay on heap memory allocation.

According to the twenty fourth aspect, since garbage collection is performed in the heap memory allocation program after processing for one page is finished by the processing program(s) other than the processing program invoking the heap memory allocation program among the processing programs executed as respective different tasks, it is supposed that a lot of data that have not been referred remain and a large continuous area is obtained by the garbage collection, and therefore frequency of garbage collection can be reduced more effectively and consequently it is possible to reduce a delay on heap memory allocation.

These and other objects, features and advantages of the present invention will become more apparent upon reading of the following detailed description along with the accompanied drawings.

BRIEF DESCRIPTION OF THE DRAWINGS

in FIG. 17;

DETAILED DESCRIPTION OF THE PREFERRED EMBODIMENT

Hereinafter, embodiments according to aspects of the present invention will be explained with reference to drawings.

Embodiment 1

Figure 21:
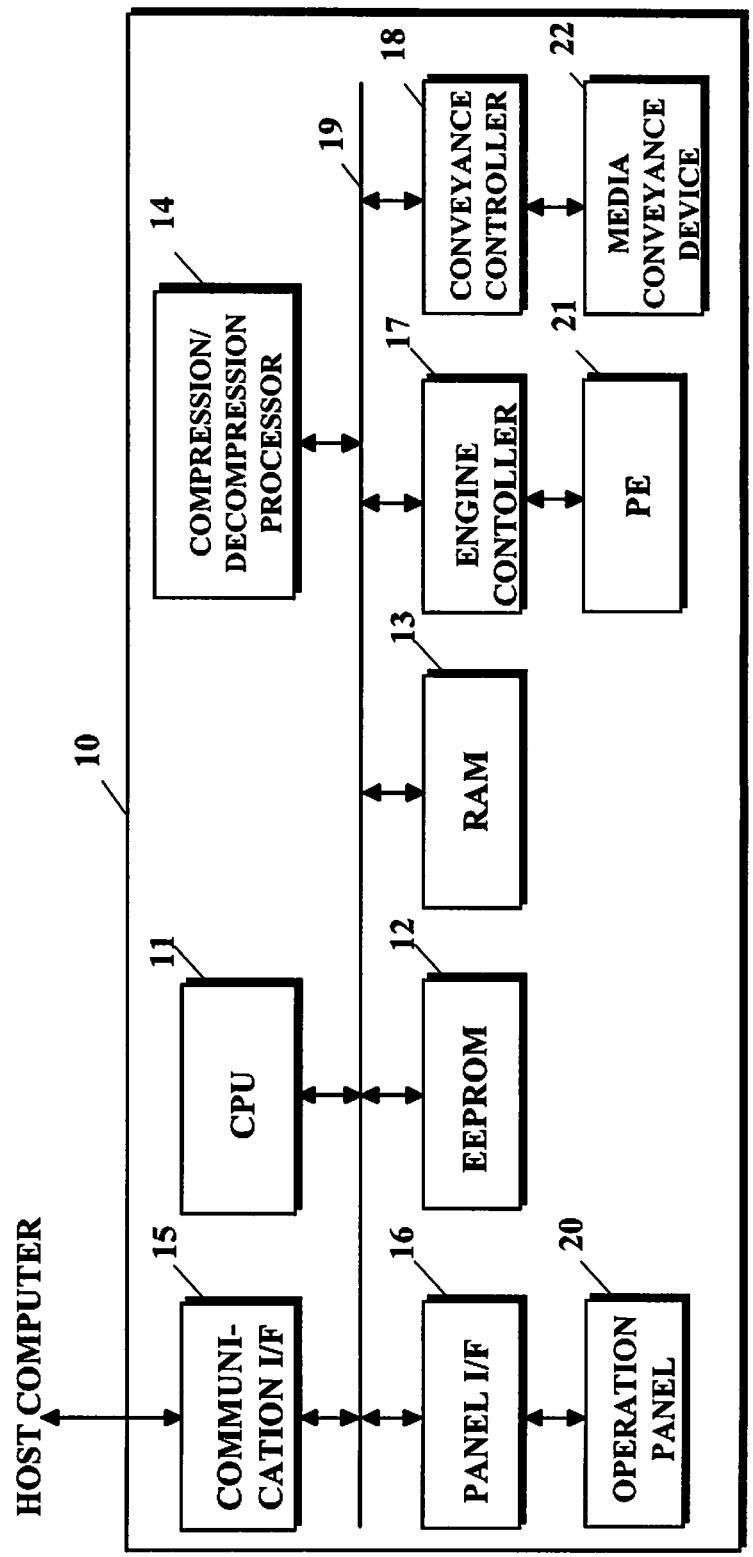
FIG. 21 is a block diagram of a hardware configuration of image forming apparatuses in Embodiments 1 to 4 of aspects of the present invention.

FIG. 21 is a schematic block diagram of a hardware configuration of an image forming apparatus 10 in Embodiment 1 of an aspect of the present invention.

In this image forming apparatus 10, a CPU 11, an EEPROM 12, a RAM 13, a compression/decompression processor 14, a communication interface 15, a panel interface 16, an engine controller 17 and a conveyance controller 18 are connected with each other by a bus 19, and an operation panel 20, an print engine 21 and a media conveyance device connect to each of the interface 16, the engine controller 17 with an interface, and the conveyance controller 18. The communication interface 15 is connected to a host computer not shown in the Figs.

In the EEPROM 12, an OS (Operating System), drivers and applications has been stored. In the RAM 13, temporary data are stored. The OS is capable of multithread processing for applications and has a semaphore system.

The compression/decompression processor 14 is constituted with, for example, an ASIC (Application Specific Integrated Circuit) and is capable of performing compression processing and decompression processing in parallel. The compression/decompression processor 14 has a compression unit 141, a decompression unit 142, a decompression unit 143 (see FIG. 1) and a DMAC (Direct Memory Access Controller), and the units 141, 142 and 143 are capable of operating in parallel. The compression/decompression processor 14 is capable of performing the process that the DMAC transfers data in the RAM 13 to the compression unit 141, the decompression unit 142 or the decompression unit 143 using block transfer, and the unit 141, 142 or 143 compresses/decompresses the data, and the DMAC transfers the compressed/decompressed data to the RAM 13 or the engine controller 17 using block transfer. The DMAC may be another device different from the compression/decompression processor 14.

The operation panel 20 has keys and a display panel. The engine controller 17 has a CPU, a memory storing a print engine control program, and a buffer memory storing received bitmap data.

Figure 1:
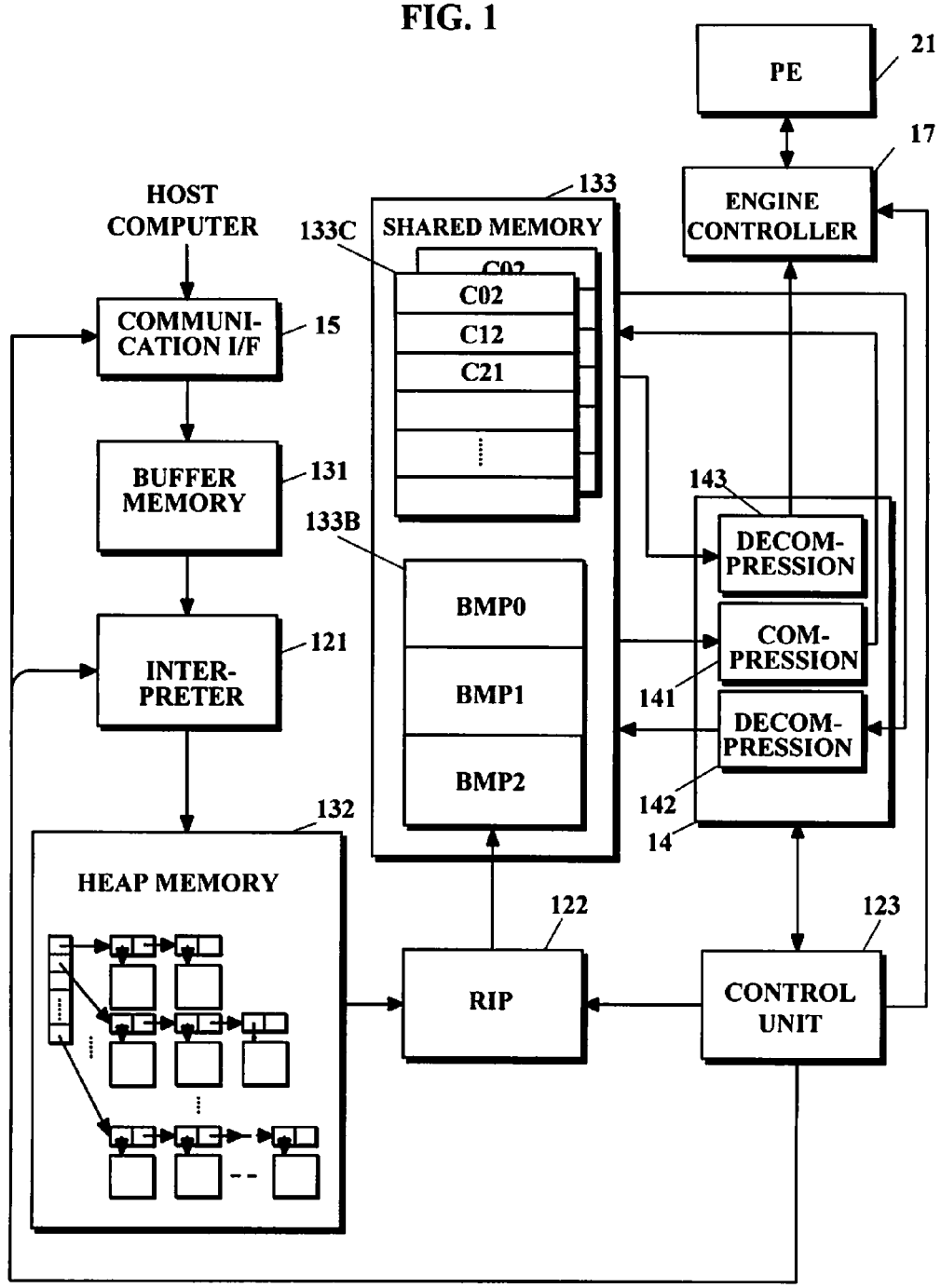
FIG. 1 is a function block diagram of the part that converts print data received from a host computer into bitmap data in Embodiments 1 to 3 of aspects of the present invention.

FIG. 1 is a function block diagram of the part that converts print data received from a host computer into bitmap data.

The print data are described in page description language (PDL), and are stored in a buffer memory 131 via the communication interface 15. In FIG. 1, the buffer memory 131, a heap memory 132 and a shared memory 133 are memory areas in the RAM 13. An interpreter 121, a RIP 122 and a control unit 123 correspond to respective parts of the application programs executed by the CPU 11.

The control unit 123 stores print data from a host computer in the buffer memory 131 via the communication interface 15 according to a print request from the host computer. The control unit 123 starts the interpreter 121, causes the interpreter 121 to transform each page of the print data to bands of display list (i.e. intermediate code), and stores the display list in the heap memory 132. The control unit 123 starts the RIP 122 and the compression/decompression processor 14, and causes them to perform the processes mentioned below.

Figure 10A:
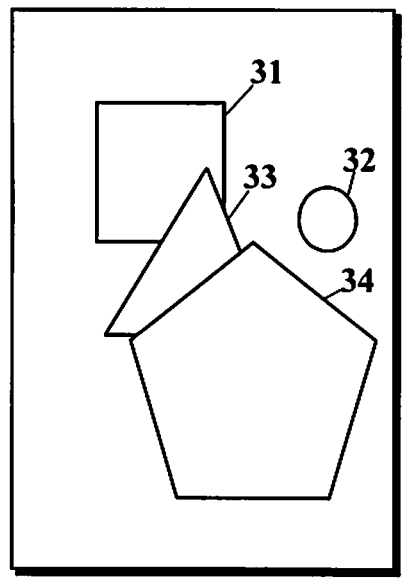
FIGS. 10A to 10C explain an example of a display list.
Figure 10B:
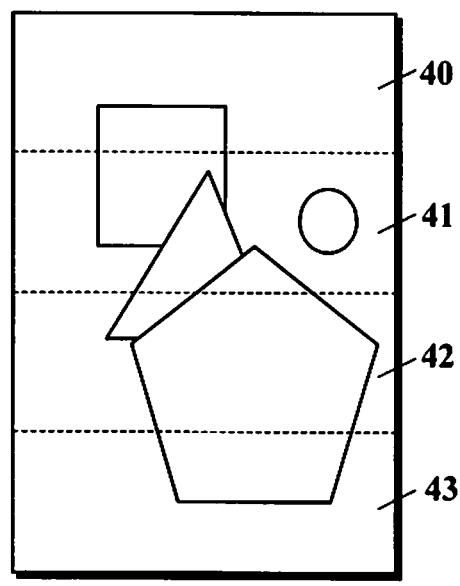
Figure 10C:
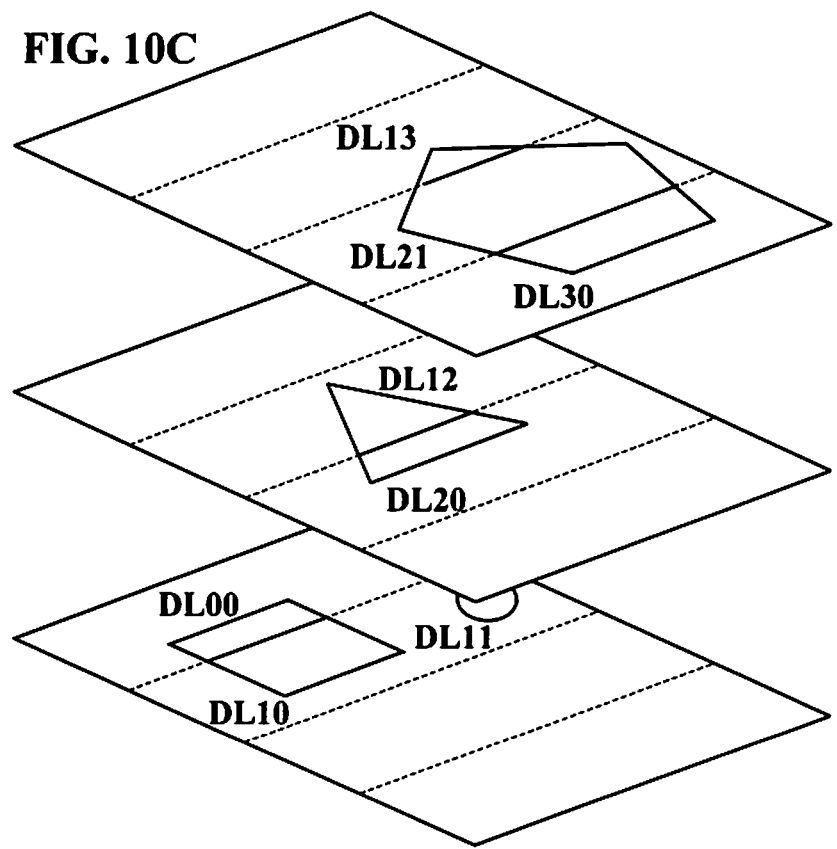

FIGS. 10A to 10C explain an example of a display list.

In FIG. 10A, figure objects 31 to 34 are described in PDL along the numerical order in one page of the print data. When the objects are rasterized along the order of being described in the print data, on a bitmap data area, the figure object 33 is overwritten on the figure object 31 and the figure object 34 is overwritten on the figure object 33, and consequently the image shown in FIG. 10A is obtained. To reduce a required memory size, the print data are divided into bands 40 to 43 as shown in FIG. 10B, and the divided objects are transformed to intermediate codes to speed-up rasterization. In general, character objects and image objects may be included in the objects to be processed rather than figure objects. In generating intermediate codes from objects, character objects as vector data are converted to image data.

FIG. 10C shows transforming each of the figure objects in the print data to bands of intermediate codes. An intermediate code of a partial object DLij in FIG. 10C is stored in an intermediate code block Lij. The intermediate code block Lij is the j-th block in the band i of a display list. In order to synthesize the figures properly, the order of describing blocks in each band is according to the order of describing the figure objects. For example, the order of describing intermediate code blocks in a band 41 of the display list is "L10, L11, L12, L13".

The larger the number of bands, the more the required memory size is reduced, but the longer the processing time. Thus, the number of bands is decided according to the size of the RAM 13. For example, the number of bands is decided as 36. Moreover, in consideration of simplifying memory management, the maximum memory size of one block is decided, and intermediate codes are stored in the block of this size as many as possible.

Figure 2:
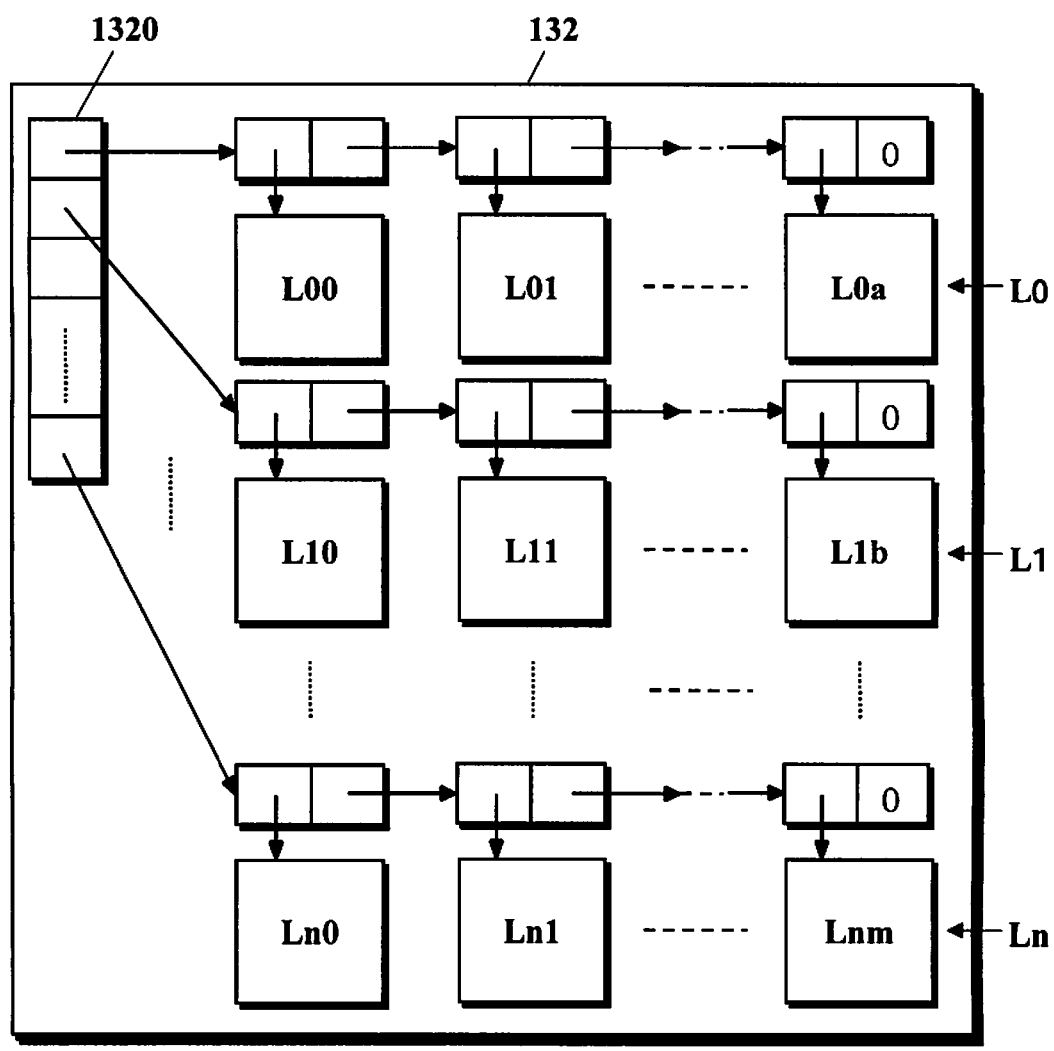
FIG. 2 shows data structure of a display list.

FIG. 2 shows data structure of a display list stored in the heap memory 132. This data structure is a list structure.

A L-band arrangement 1320 is an arrangement that the number of elements is the same as the number of bands and an element i (where i is any of 0 to n) is a pointer to a display list Li. In general, the number of blocks in each of the display lists Li is not constant. For simplicity, FIG. 1 shows the case that the number of blocks in each display list is 3. In case of image data, an intermediate code of the block Lij is a code that includes a pointer to a storage area of the image data and the number of bytes of the data, but the block Lij does not include the image data. If the image data includes a boundary between bands, each of the image data divided by the band boundary is identified with a pointer and the number of bytes.

In the shared memory 133, a bitmap data area 133B and a compression data area 133C are reserved. The compression/decompression processor 14 has the compression unit 141 and the decompression unit 142, which are capable of operating in parallel.

Next, processing of the band i by the RIP 122, the compression/decompression processor 14 and the control unit 123 controlling them will be explained. First of all, the initial value of a block identification variable j is set to zero, and the control unit 123 starts the RIP 122 for each page and starts the compression/decompression processor 14 for each band.

STEP (1): if j=0, go to STEP (2); if j>0, the decompression unit 142 reads compressed data stored in a compression band area Ci, decompresses it to an original bitmap data, and stores the decompressed bitmap data in a sub area BMPk.

STEP (2): the RIP 122 transforms the intermediate code block Lij in the heap memory 132 to bitmap data and overwrites the bitmap data on the bitmap data decompressed in STEP (1) by storing the bitmap data generated by the RIP 122 in the sub area BMPk.

STEP (3): the compression unit 141 compresses the bitmap data stored in the sub area BMPk and stores the compressed data in the compression band area Ci of the compression data area 133C.

STEP (4): the RIP 122 increases j by 1, and if another intermediate code block Lij is in the heap memory 132, then return to STEP (1).

Figure 4:
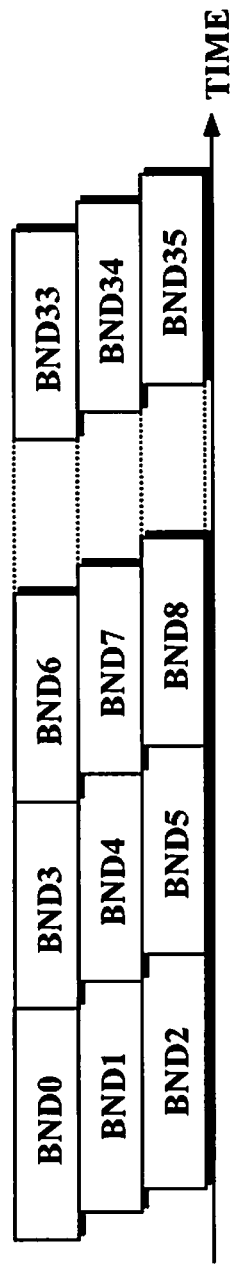
FIG. 4 shows an order of processing bands.

The compression unit 141 and the decompression unit 142 can operate in parallel and processes in the compression/decompression processor 14 can be performed in parallel with software processing for generating a display list and rasterizing. On the other hand, for a band, optional two out of (1) compression processing, (2) decompression processing and (3) software processing can not be done at the same time. Therefore, three bands are processed at the same time as shown in FIG. 4. For example, Band 1 is compressed, and generating a display list and rasterizing are performed sequentially of Band 2 while Band 0 is being decompressed. Since bitmap data are handled in each of compression, decompression and rasterization, the bitmap data area 133B has an area that is divided into BMP0 to BMP2 for the three bands as shown in FIG. 1.

Total compression rate of both compressed data from one page of bitmap data and bitmap data areas for three bands is $3/(n+1)+1/c$, where $1/c$ is the average compression rate of the compression unit 141, c=(size before compression)/(size after compression) and n+1 is the number of bands in a page. For example, if n=35 and c=10, then the compression rate is 11/60=3/6+1/10.

Figure 3:
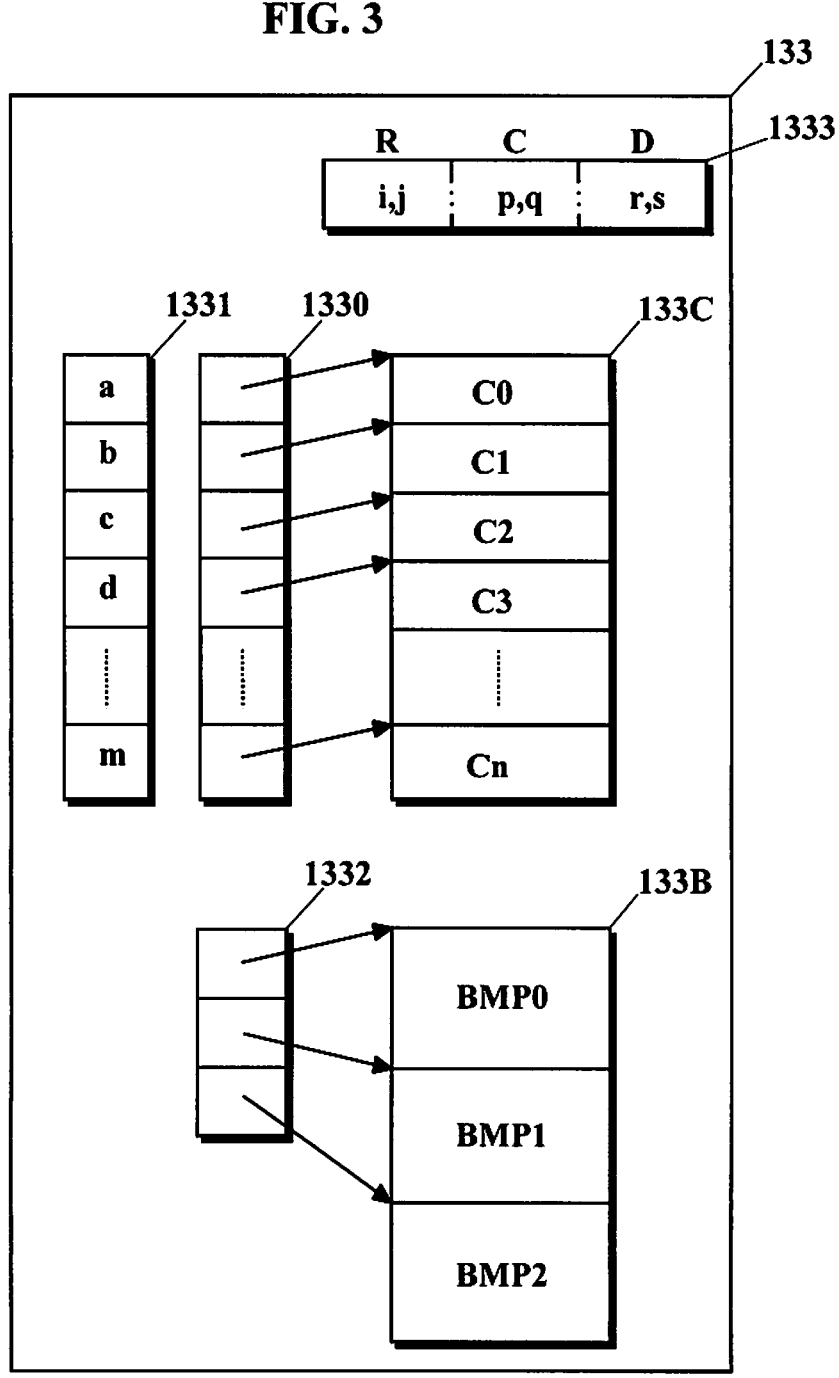
FIG. 3 shows data structure in relation to rasterization, compression and decompression.

FIG. 3 shows data structure in relation to rasterization, compression and decompression.

A C-band arrangement 1330 is an arrangement that the number of elements is the same as the number of bands and an element i (where i is any of 0 to n) is a pointer to a compression band area Ci. A block maximum number arrangement 1331 is an arrangement that the number of elements is the same as the number of bands and an element i is the block number maximum value je(i). A B-band arrangement 1332 is an arrangement that the number of elements is three and an element k (where k is any of 0 to 2) is a pointer to the sub area BMPk.

A band-block number variable group 1333 has variables R, C and D. Pairs (i, j), (p, q) and (r, s) are stored in the variables R, C and D, respectively, and each of the pairs has a band number and a block number of a band and a block processed currently. The variables R, C and D are used to notify completion of processing a block between threads (in STEP S5 in FIG. 5, STEP S16 in FIG. 6A and STEP S24 in FIG. 6B) in order to make beginning timing of processes proper, that is, in order to rasterize after finishing decompression and compress after rasterization and decompress after finishing compression. In an example mentioned below, a band number and a block number of a band and a block processed currently or next stored in the band-block number variable group 1333 also mean completion of processing the previous band and the previous block.

Figure 7:
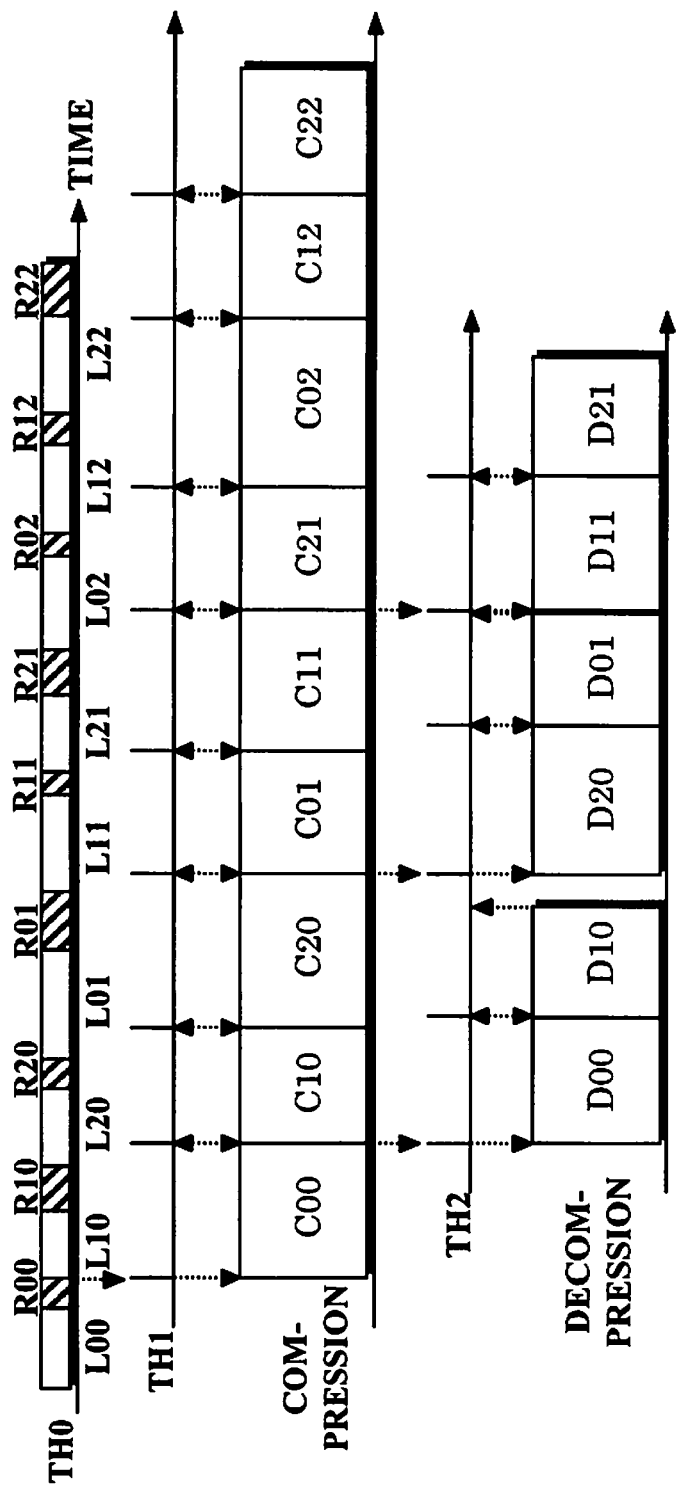
FIG. 7 is a timing chart that depicts a part of the process shown in FIGS. 5, 6A and 6B.
Figure 8:
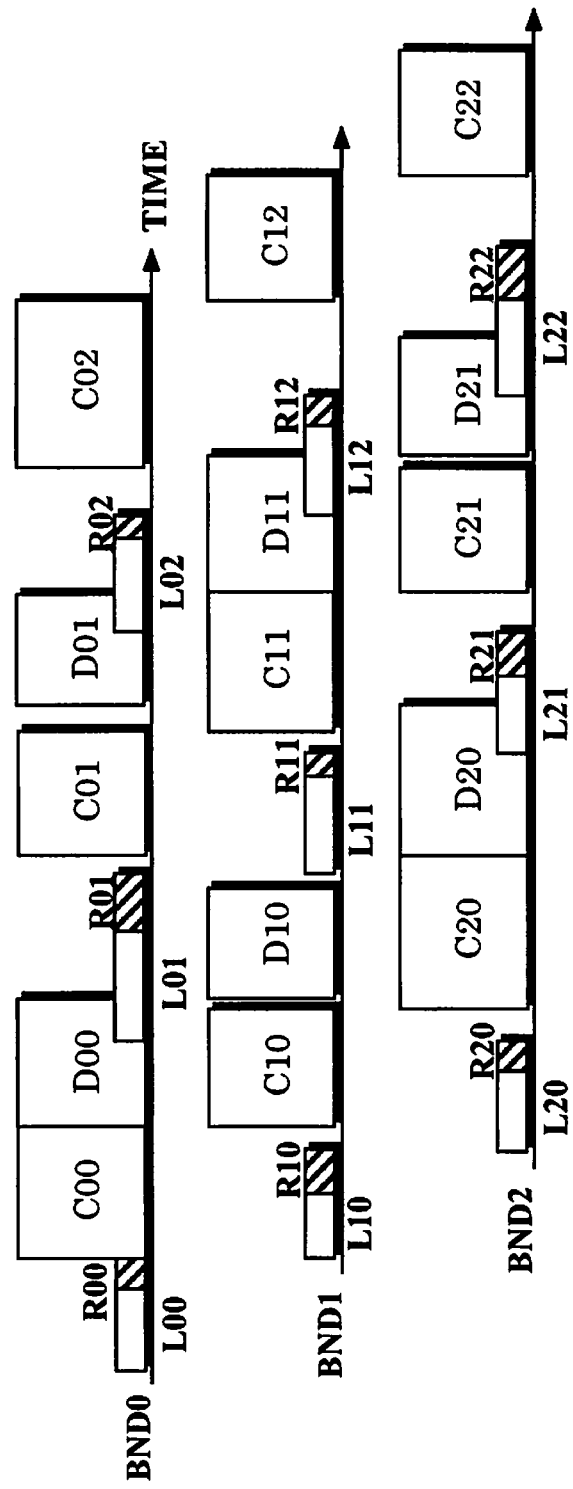
FIG. 8 is a timing chart in which the processes shown in FIG. 7 are rearranged for each of bands BND0 to BND2.

FIG. 7 is a timing chart that explains parallel processing of software, the compression unit 141 and the decompression unit 142. FIG. 7 shows a case that each of the bands 0 to 2 has three blocks of display lists. FIG. 8 is a timing chart in which the processes shown in FIG. 7 are rearranged for each of bands BND0 to BND2.

Lij, Rij, Cij and Dij mean processes of generating a display list, rasterization, compression and decompression on a band i and a block j, respectively.

In FIGS. 1 and 7, threads Th1 and Th2 in the control unit 123 control starting the compression unit 141 and starting the decompression unit 142, respectively. Processes by the interpreter 121 and the RIP 122 are done in a thread Th0. Thus, the three threads are executed in parallel.

The thread Th0 is generated and started by the control unit 123. In the thread Th0, an intermediate code block L00 is generated, and then rasterization R00 is done, and upon completion of the rasterization R00, the thread Th1 is generated and started by the thread Th0. In the thread Th1, compression C00 is done by the compression unit 141, and upon completion of the compression C00, the thread Th2 is generated and started by the thread Th1. In the threads Th1 and Th2, compression C10 by the compression unit 141 and decompression D00 by the decompression unit 142 are done, respectively.

In the thread Th0, generating an intermediate code block Lij and rasterization Rij are performed along the order of the bands and the blocks, and the rasterization Rij has been finished at the time when the compression Cij is started. "The order of the bands and the blocks" means that at first, initial values of a block number variable j and a band sub-number variable i0 are set to zero, then a band number variable i and the block number variable j are changed as follows.

STEP (a): set the values of i0, i0+1 and i0+2 to the band number variable i in turn without changing the block number variable j;

STEP (b): if j is less than the block number maximum value je(i), then increase j by 1 and return to STEP (a), otherwise go to STEP (d).

STEP (d): if i0+2 is less than the maximum band number value n, then set j to zero and increase i0 by 3 and return to STEP (a).

In the thread Th1, when a process completion notice of the compression unit 141 on one block is received, the band number p and/or the block number q are/is updated along the order of the bands and the blocks, and then the compression Cpq is started by the compression unit 141 upon finishing the rasterization Rpq. In a test case, as shown in FIG. 7, a series of the compression Cpq was performed without breaks, continuously.

In the thread Th2, when a process completion notice of the decompression unit 142 for one block is received, the band number r and/or the block number s are/is updated along the order of the bands and the blocks, and then the decompression unit 141 starts the decompression Drs, but the decompression Drs is never started for the last block je(r) in each band r.

Figure 5:
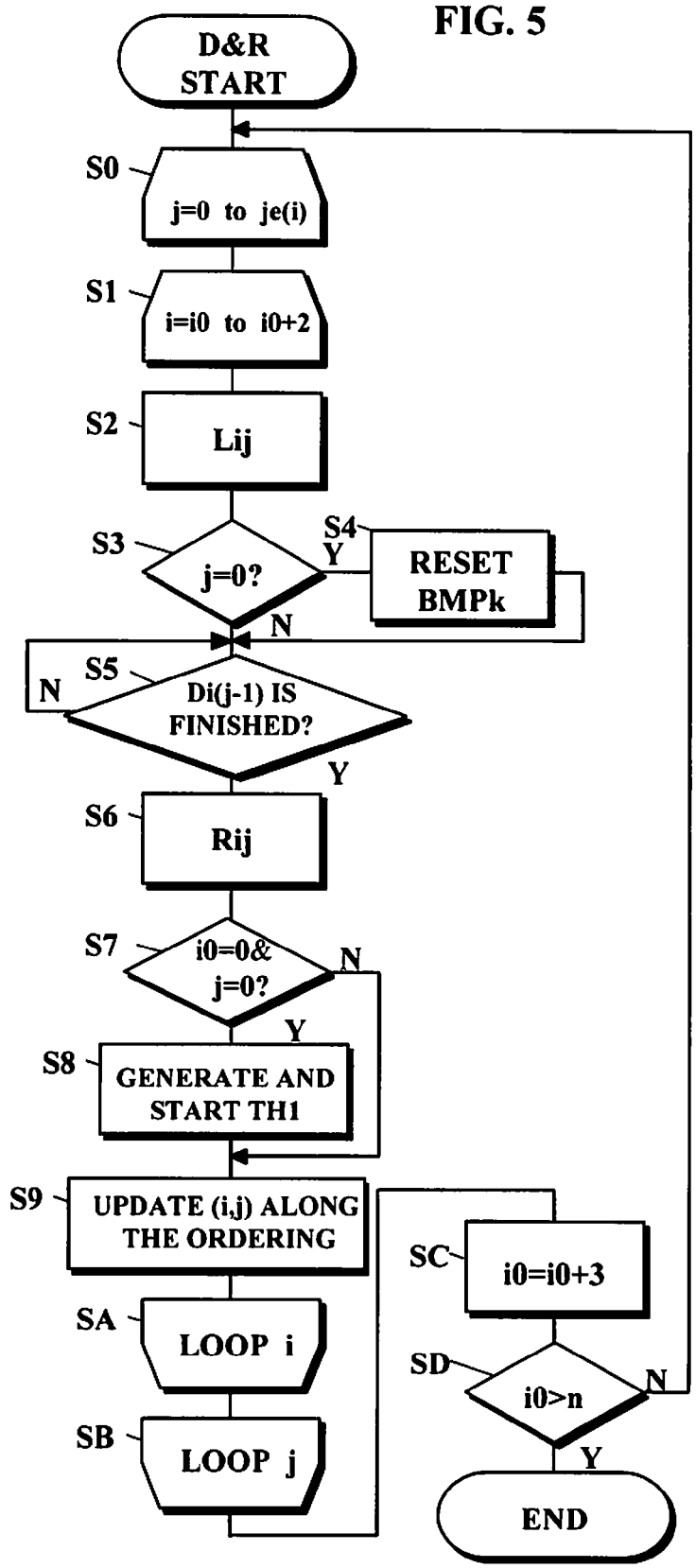
FIG. 5 is a flowchart that explains generating a display list and rasterizing in a thread Th0.

FIG. 5 is a flowchart that explains processes in the thread Th0. First of all, the initial value of i0 is set as zero, then the processes are performed as follows. Symbols between parentheses are represented steps in FIG. 5.

STEP (S0): read the value je(i) stored in the element i of the block maximum number arrangement 1331, and then perform processes of STEPs (S1) to (SA) iteratively for each of the blocks j=0 to je(i) in turn.

STEP (S1): perform processes of STEPs (S2) to (S9) iteratively for each of i=i0 to i0+2 in turn.

STEP (S2): generate the intermediate code block Lij into the heap memory 132.

STEPs (S3 and S4): if j=0, then reset the value of sub area BMPk to zero. Here, k is derived from the relation i=i0+k.

STEP (S5): determine whether the decompression Di(j−1) is finished or not with referring the content (r, s) of the variable D in the band-block number variable group 1333 (but, if j=0, whether the decompression D(i−1)j is finished or not), that is, determine whether r=i and s=j or not. If determining the decompression Di(j−1) is finished, then go to STEP (S6).

STEP (S6): read the intermediate code block Lij from the heap memory 132 and rasterize it, then overwrite the rasterized data on the sub area BMPk of the bitmap data area 133B.

STEPs (S7 and S8): if i0=0 and j=0, then generate and start the thread Th1.

STEP (S9): update the content (i, j) of the variable R in the band-block number variable group 1333 as mentioned above. Specifically, (i, j) is changed to the next value along the order of the bands and the blocks.

STEP (SC): increase i0 by 3.

STEP (SD): if i0>n, then end the process; otherwise return to STEP (S0).

Figure 6A:
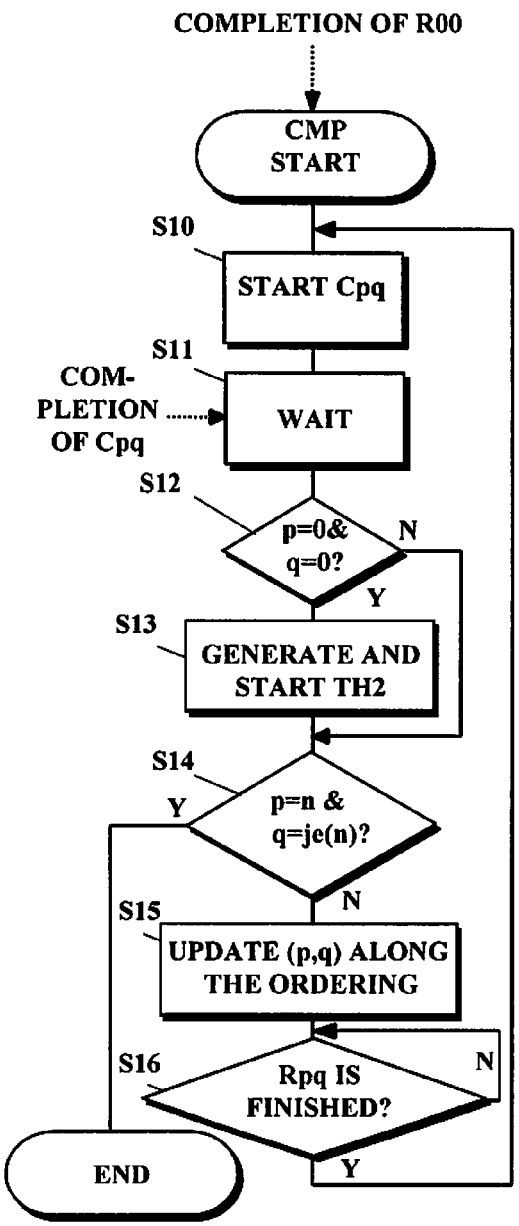
FIG. 6A is a flowchart of a compression process in a thread Th1 and FIG. 6B is a flowchart of a decompression process in a thread Th2.

FIG. 6A is a flowchart that explains processes in the thread Th1. First of all, the initial values of the band number variable p and the block number variable q are set to zero, then the processes are performed as follows.

STEP (S10): read the content (p, q) of the variable C in the band-block number variable group 1333 and start the compression Cpq by the compression unit 141. In this time, the content of the element i of the C-band arrangement 1330 as the top address of a compressed data storing area and the content of the element k of the B-band arrangement 1332 as the top address of data to be compressed are supplied to the compression unit 141. Here, k is remainder on dividing p by 3.

STEP (S11): wait for occurring a process completion event of the compression unit 141. Upon occurrence of the event, end the wait status and go to STEP (S12). In the wait status, another thread becomes active by the OS right away, and consequently a delay is avoided on processes in FIG. 5.

STEPs (S12 and S13): if p=0 and q=0, then generate and start the thread Th2.

STEP (S14): if p=n and q=je(n), then end the process; otherwise go to STEP (S15).

STEP (S15): The value(s) of p and/or q are/is updated along the order of the bands and the blocks, then the content (p, q) of the variable C in the band-block number variable group 1333 is changed with the updated value(s) of p and/or q.

STEP (S16): determine whether the Rpq is finished or not with referring the content (i, j) of the variable R in the band-block number variable group 1333, that is, determine whether i=p and j=q+1 if q=0 or 0<q<je(p), or whether i=p+1 and j=0 if q=je(p). If determining the Rpq is finished, then go to STEP (S10).

Figure 6B:
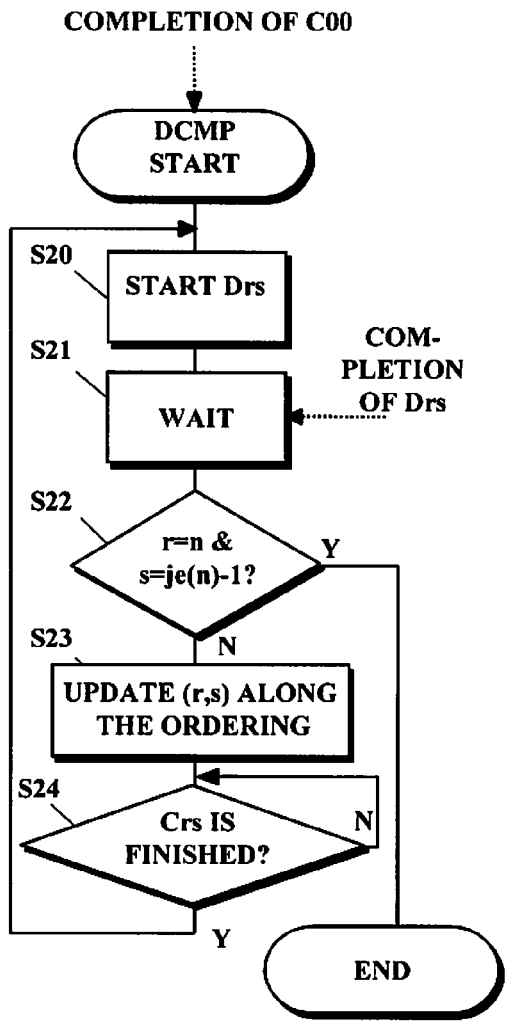

FIG. 6B is a flowchart that explains processes in the thread Th3. First of all, the initial values of the band number variable r and the block number variable s are set to zero, then the processes are performed as follows.

STEP (S20): read the content (r, s) of the variable D in the band-block number variable group 1333 and start the decompression Dpq by the decompression unit 142. In this time, the content of the element i of the C-band arrangement 1330 as the top address of data to be decompressed and the content of the element k of the B-band arrangement 1332 as the top address of a decompressed data storing area are supplied to the decompression unit 142. Here, k is remainder on dividing r by 3.

STEP (S21): wait for occurring a process completion event of the decompression unit 142. Upon occurrence of the event, end the wait status and go to STEP (S22). In the wait status, another thread becomes active by the OS right away.

STEP (S22): if r=n and s=je(n)-1, then end the process; otherwise go to STEP (S23).

STEP (S23): The value(s) of r and/or s are/is updated along the order of the bands and the blocks, then the content (r, s) of the variable D in the band-block number variable group 1333 is changed with the updated value(s) of r and/or s.

STEP (S24): determine whether the Crs is finished or not with referring the content (p, q) of the variable C in the band-block number variable group 1333, that is, determine whether p=r and q=s+1 if s=0 or 0<s<je(r), or whether p=r+1 and q=0 if s=je(p). If determining the Crs is finished, then go to STEP (S20).

In processes mentioned above, one page of the compressed data (i.e. page data) is generated in the compression data area 133C. Upon generating the page data, the control unit 123 generates and starts a thread ThP in the control unit 123 other than the three threads described above.

In the thread ThP, after it is determined that data input of the engine controller 17 is on ready status, the decompression unit 143 is caused to decompress the page data along the order of the bands and transfer the decompressed data to the engine controller 17. In this time, for the band i, the content of the element i of the C-band arrangement 1330 as the top address of data to be decompressed and the address of the engine controller 17 as the destination address are supplied to the decompression unit 143.

The engine controller 17 receives the transferred bitmap data and stores them in a buffer memory inside, and then transforms them to sequential data and changes the sequential data to a video signal, and supplies the signal to the print engine 21. The print engine 21 generates an electrostatic latent image on a photoconductor based on the signal and a control signal from the engine controller 17, develops a toner image by causing toner to adhere to the electrostatic latent image, transfers the toner image on a printing medium, and fixes the image on the printing medium by heating and pressurizing. On the other hand, the CPU 11, according to a program, controls the conveyance controller 18 to cause a printing media conveying device 22 to convey the printing media to the print engine 21, and to output the printed media by conveying it onto a tray.

Figure 9:
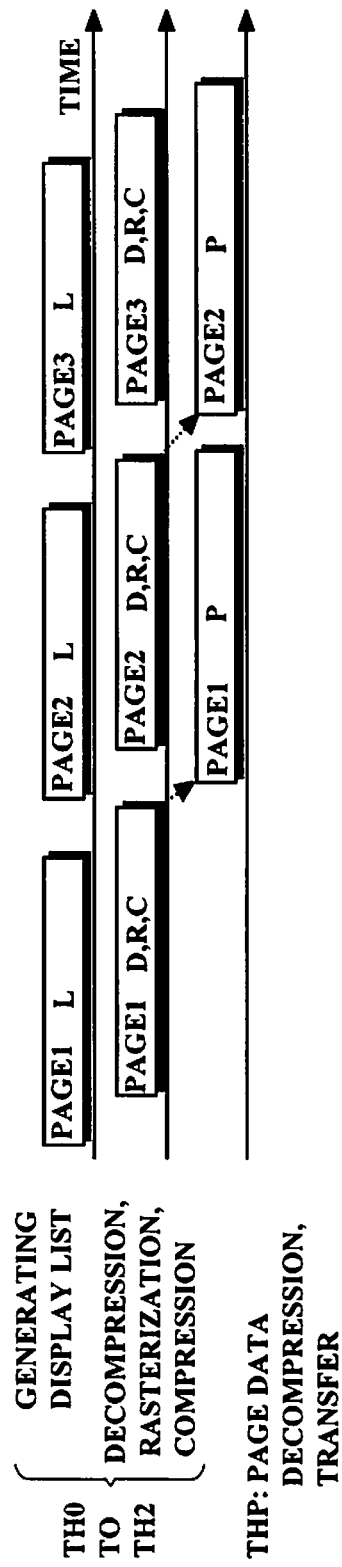
FIG. 9 is a timing chart that depicts processes of decompression and transmission for the compressed data and other processes.

FIG. 9 is a timing chart that depicts processes of decompression and transmission for the compressed page data and other processes.

In these processes, decompression, rasterization and compression for each band in the second page by the threads Th0 to Th2 and decompression and transfer of the page data in the first page by the thread ThP are performed in parallel, and then the third page is processed in the same way.

According to Embodiment 1, since the bitmap data area is required for only three bands, a required memory size can be reduced, and since decompression, rasterization and compression for three bands are shifted relative to each other and performed in parallel, each of compression and decompression easily comes to be performed relatively continuously and print data can be converted to bitmap data at high speed. Moreover, since decompression, rasterization and compression are performed in different tasks in parallel, each of compression and decompression easily comes to be performed relatively continuously.

Further, since the compression/decompression processor 14 is a hardware compression/decompression processor that has one channel of compression and two channels of decompression and is controlled to start compression and decompression by the thread Th1, Th2 and ThP, the CPU load of these processes becomes light. Therefore, in the thread Th0, a process delay due to these threads becomes small, and the whole processes can be done at high speed efficiently by parallel processing. Furthermore, the program structure is simplified by using multi-threading, and consequently, it is possible to reduce the development term and the product cost.

It should be noted that the decompression unit 143 might be equipped in the engine controller 17 to perform decompression in the engine controller 17, so that it is possible to transfer the page data more efficiently.

Embodiment 2

Where generating a display list and rasterizing are performing sequentially in Embodiment 1, both can be performed in different threads in parallel, and therefore this will be explained in Embodiment 2 of an aspect of the present invention.

Figure 12:
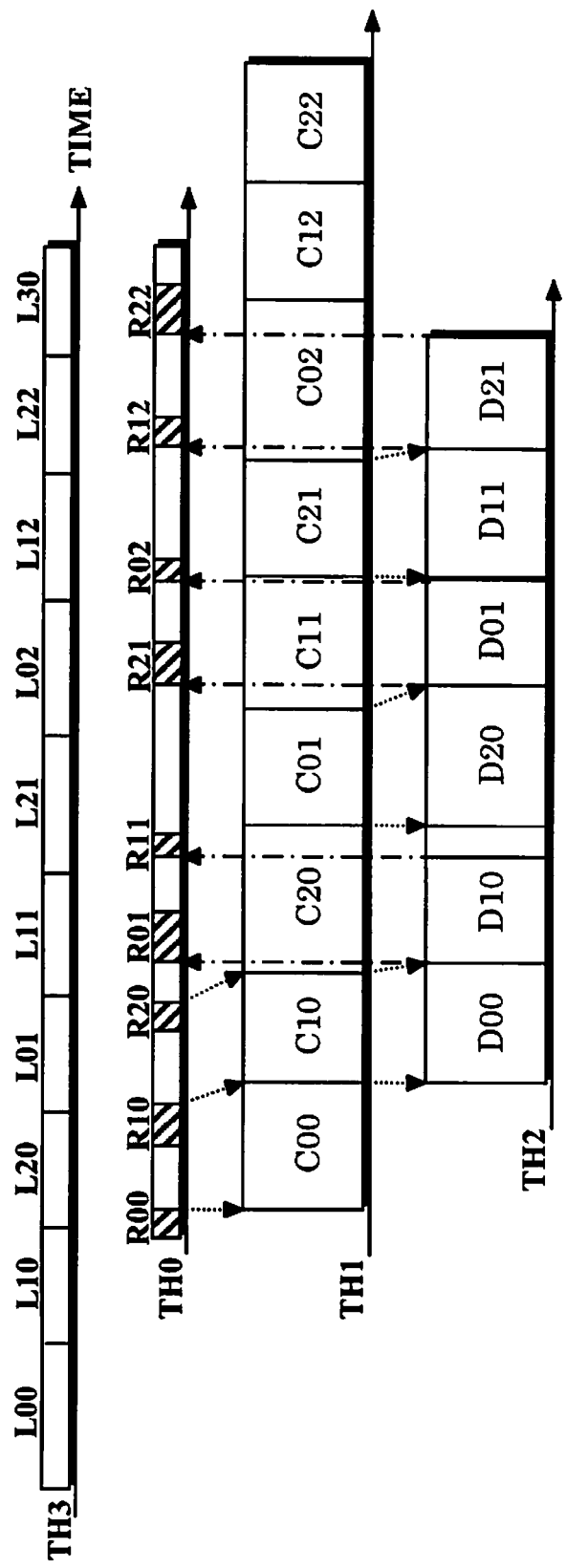
FIG. 12 is a timing chart that depicts a part of the process in Embodiment 2.

As shown in FIG. 12, a thread Th3 only for processing display lists is generated and started before the thread Th0, and the intermediate code blocks Lij are generated while the pair (i, j) is being updated along the order of the bands and the blocks.

Figure 11:
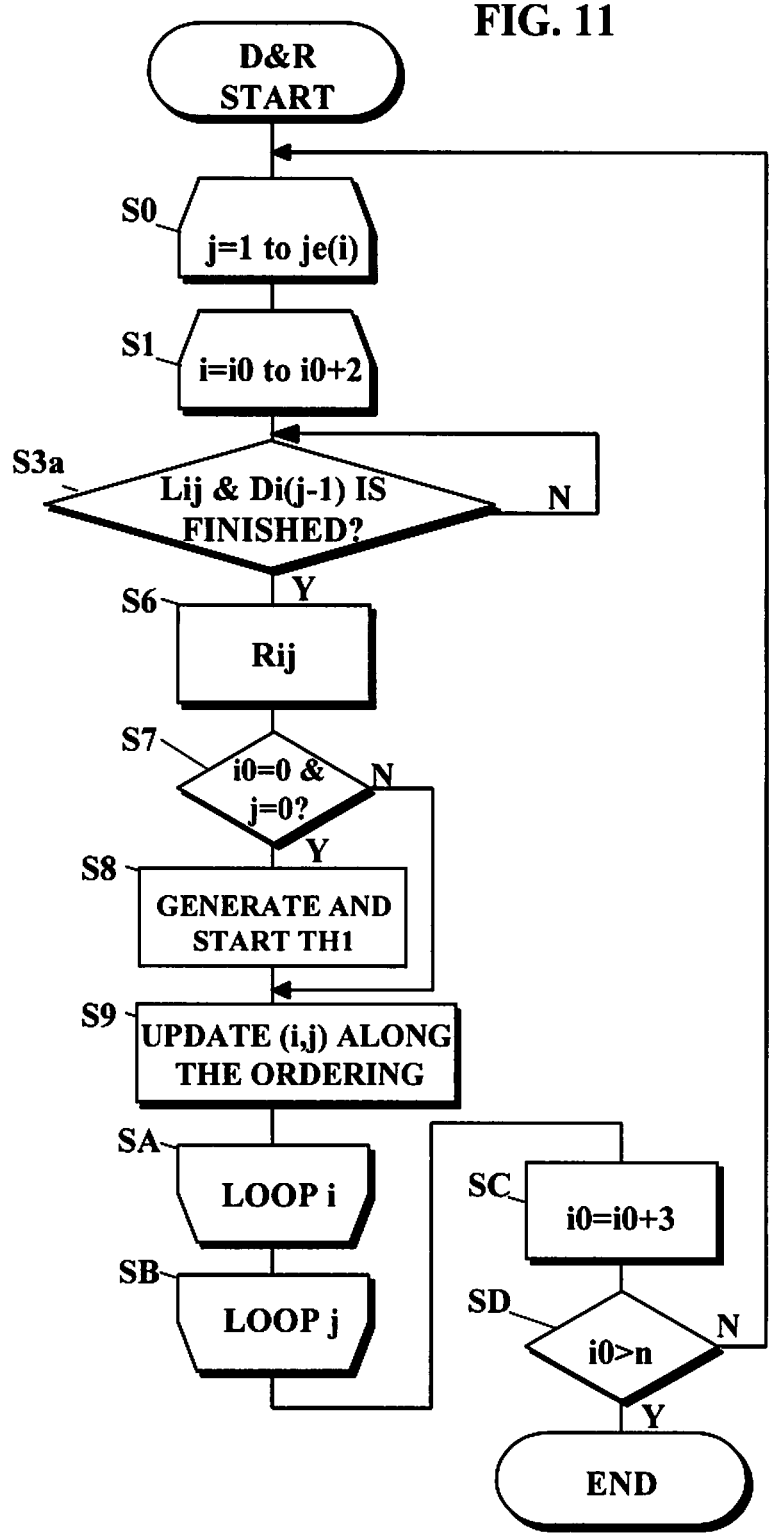
FIG. 11 is a flowchart that explains generating a display list and rasterizing in Embodiment 2 of an aspect of the present invention.

FIG. 11 is a flowchart that explains processes in the thread Th0 in this case. The difference between processes in FIG. 11 and FIG. 5 is to wait for finishing not only the decompression Di(j-1) but generating the intermediate code block Lij in STEP (S3a) instead of STEPs (S2) and (S5). To notify completion of generating the intermediate code block Lij, a variable L is added to the group 1333, and a band number and/or a block number in the variable L are/is updated every time when finishing generating one block of the intermediate code in the thread Th3.

Figure 13:
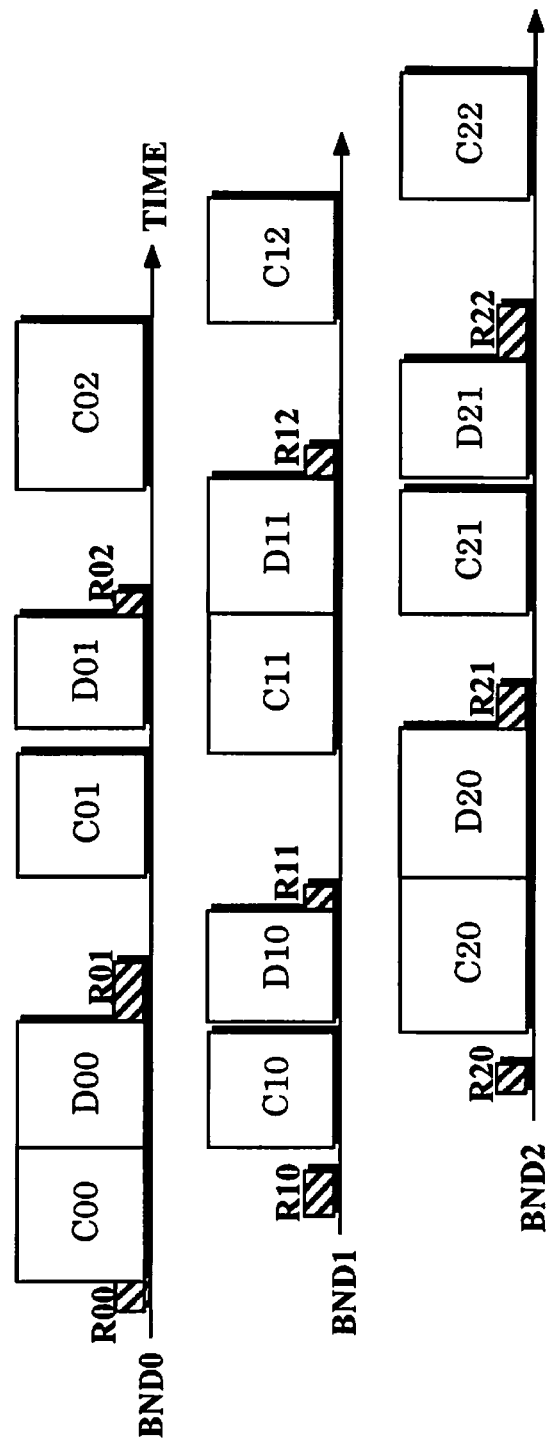
FIG. 13 is a timing chart in which the processes shown in FIG. 12 are rearranged for each of bands BND0 to BND2.

FIG. 13 is a timing chart in which the processes shown in FIG. 12 are rearranged for each of bands BND0 to BND2.

The others in Embodiment 2 are identical to those in Embodiment 1.

According to Embodiment 2, since generating a display list and rasterization are performed in parallel, each of the processes can be simplified, and since the time required to rasterize is relatively shorter than idle time of rasterization, a delay due to switching between generating an intermediate code (e.g. a display list) and rasterization is reduced in time divisional parallel processing.

Embodiment 3

Where starting decompression, rasterizing and starting compression are performed in different threads and three bands are processed along the order of the bands in each of the threads in Embodiments 1 and 2, starting decompression, rasterizing and starting compression can be performed for one band in each of the threads. In this case, it is possible to use the same function in three threads for three bands where variables in the function are only different from each other.

Figure 15:
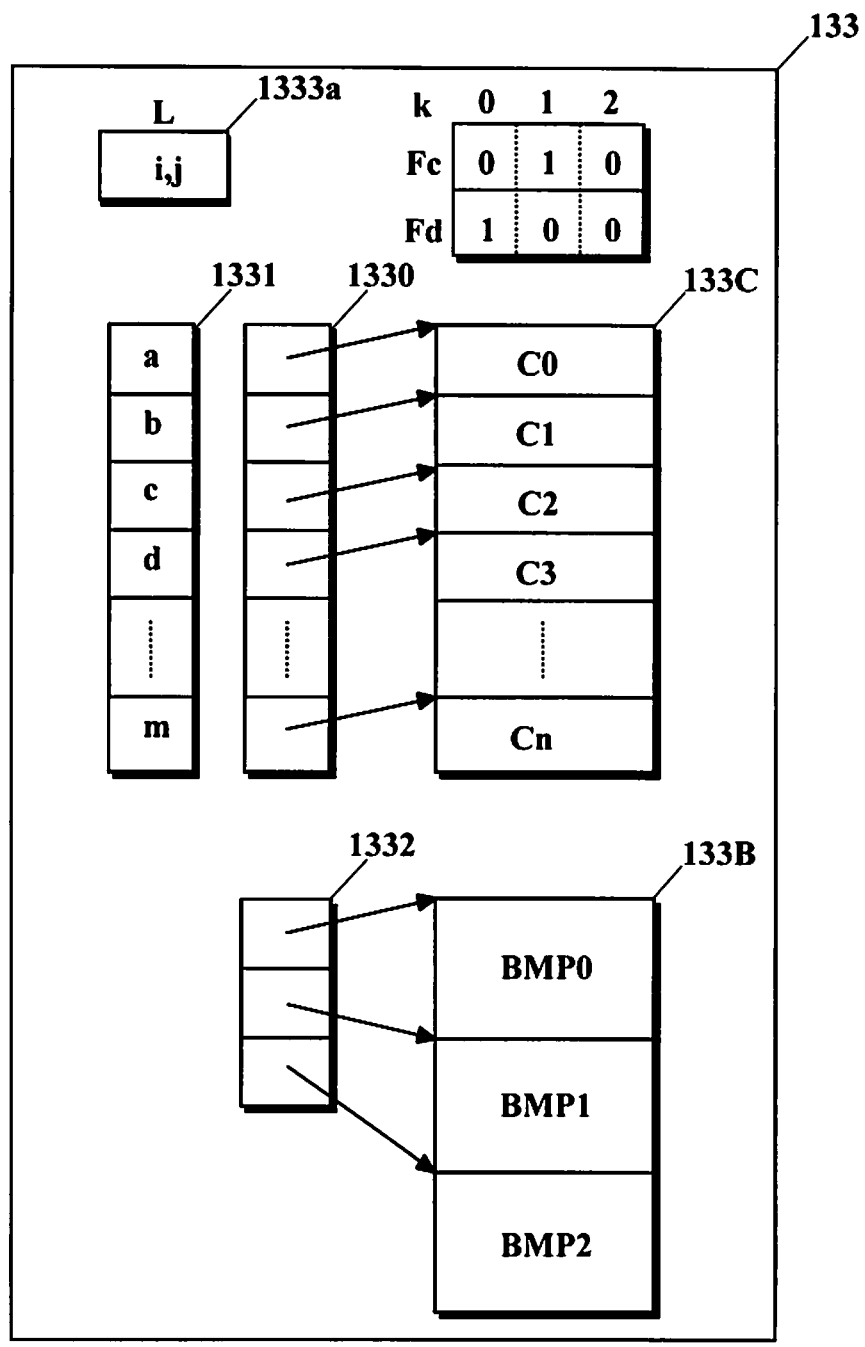
FIG. 15 shows data structure in relation to rasterization, compression and decompression in Embodiment 3 of an aspect of the present invention.

Since only one band can be processed on each of the compression and the decompression at the same time, synchronization is required between threads. Therefore, as shown in FIG. 15, for each of sub areas BMPk, k=0 to 2, a compression completion flag Fc(k) and a decompression completion flag Fd(k) are stored in the shared memory 133. Moreover, in the shared memory 133, a band-block number variable 1333a is also stored instead of the band-block number variable group 1333 shown in FIG. 3. The band-block number variable 1333a indicates the last one in the intermediate code blocks that have already been generated. The others in FIG. 15 are identical to those in FIG. 3.

Figure 16:
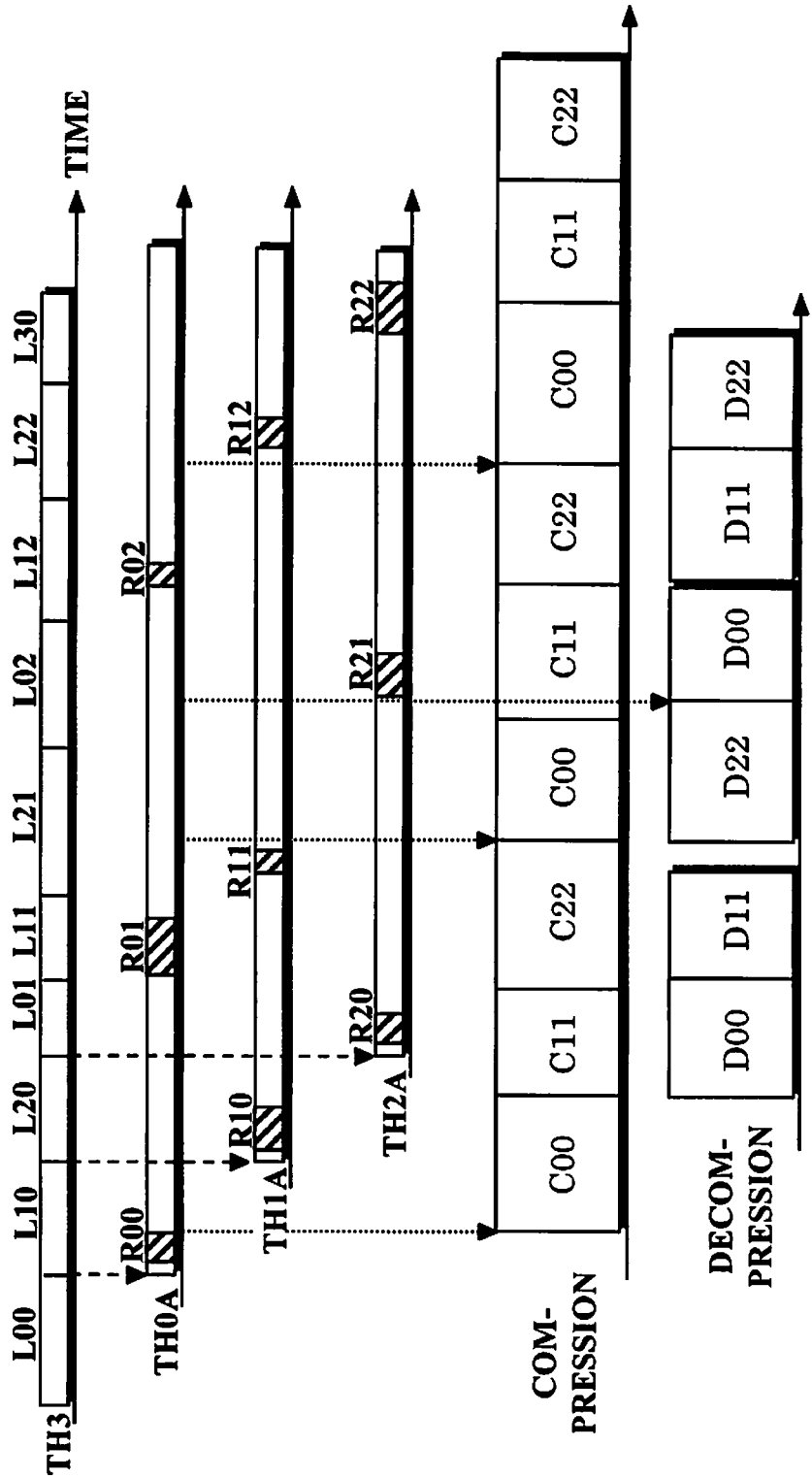
FIG. 16 is a timing chart that depicts a part of the process in Embodiment 3.

FIG. 16 is a timing chart that explains threads Th0A, Th1A, Th2A and Th3A and processing of the compression unit 141 and the decompression unit 142. In FIG. 16, for simplicity, the broken lines that represent relations between a thread and the compression/the decompression are drawn for only relations between the thread Th0A and the compression/the decompression.

The thread Th3 is identical to that in FIG. 12 and executed in parallel with the threads Th0A to Th2A. The threads Th0A, Th1A and Th2A are generated and started at the time when generating the intermediate code block L00, L10 and L20 in the thread Th3 are finished, respectively. Generating and starting the threads may be performed in either the thread Th3 or another thread (not shown).

The second index j of the compression Cij and the decompression Dij in FIG. 12 represents the block number, but the second index of them in FIG. 16 represents k of the sub area BMPk. Thus, in FIG. 14, they are represented as Cik and Dik. Consequently, the compression Cik means compressing bitmap data in the sub area BMPk and storing the compressed data in the compressed data area of the band i, and the decompression Dik means decompressing the data in the compressed data area of the band i and storing the decompressed data in the sub area BMPk.

Figure 14:
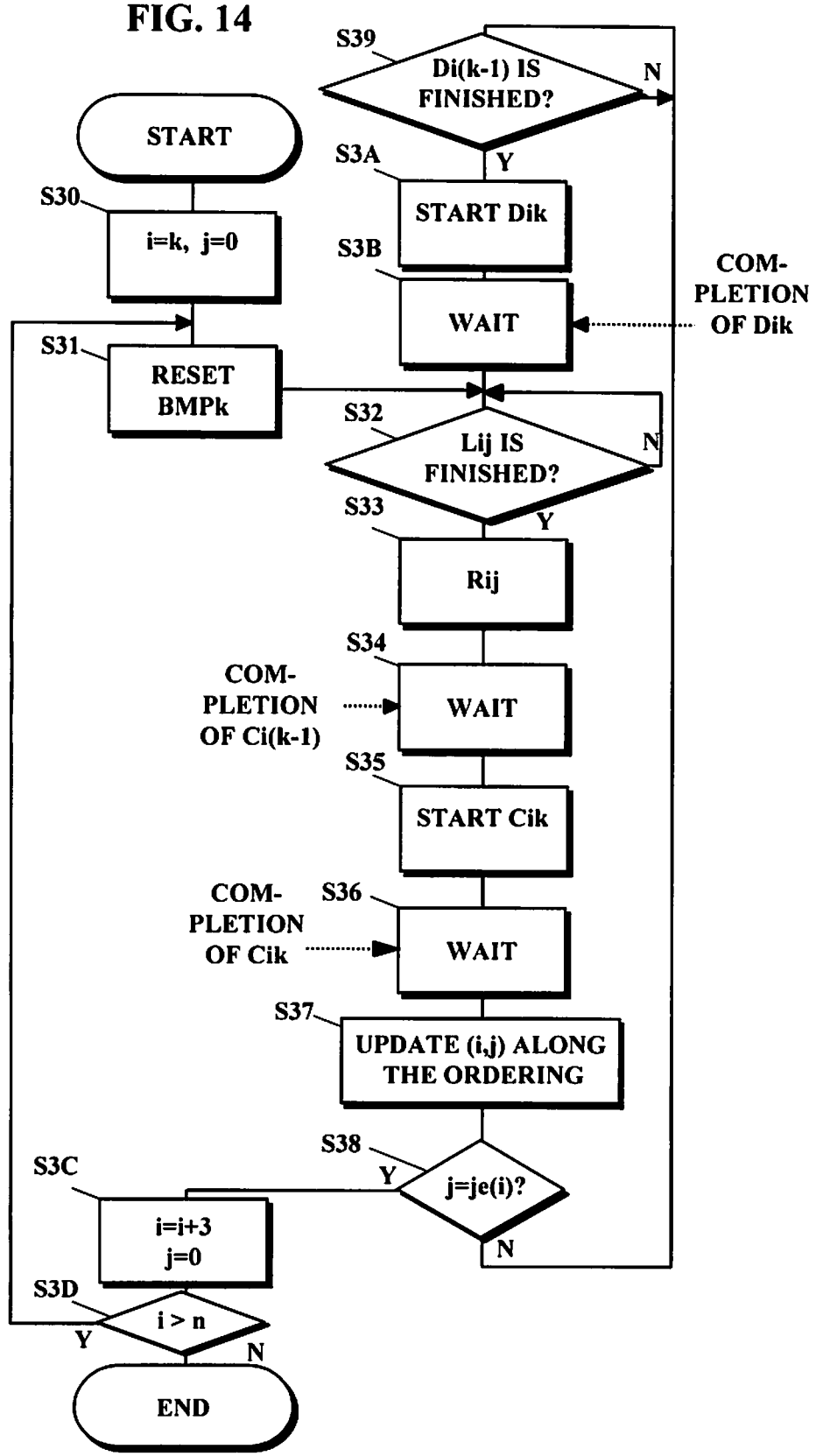
FIG. 14 is a flowchart that explains a process performed in any of thread Th0A to Th2A in Embodiment 3 of an aspect of the present invention.

FIG. 14 is a flowchart that explains a process performed in any of thread Th0A to Th2A.

STEP (S30): substitute the value of k for the band identification variable i, and substitute zero as the initial value for the block identification variable j of this band.

STEP (S31): reset the value of sub area BMPk to zero.

STEP (S32): if generating the intermediate code block Lij is finished, go to STEP (S33).

STEP (S33): do the rasterization Rij.

STEP (S34): wait for finishing the compression Ci(k−1). Upon occurrence of a process completion event of the compression unit 141 started by the thread Th(k−1)A, in an event handler that receives the event, if the value of the compression completion flag Fc(k−1) is 1, change the value to zero and go to STEP (S35); otherwise leave the event handler, and then switch the current thread by the OS. It should be noted that when k=0, the value of k is considered to be 3 in Ci(k−1) and Fc(k−1). In the wait status where the process completion event has not occurred yet, another thread becomes active by the OS right away, and consequently a delay is avoided on processes in FIG. 14. This is the same in other wait statuses.

STEP (S35): start the compression Cik by the compression unit 141. In this time, the content of the element i of the C-band arrangement 1330 as the top address of a compressed data storing area and the content of the element k of the B-band arrangement 1332 as the top address of data to be compressed are supplied to the compression unit 141.

STEP (S36): Upon occurrence of a process completion event of the compression unit 141 started in STEP (S35), in an event handler that receives the event, set the value of the compression completion flag Fc(k) in FIG. 15 to 1, then go to STEP (S37).

STEP (S37): The pair (i, j) is updated in the ordering of the bands and the blocks as mentioned in Embodiment 1.

STEP (S38): if j=je(i), then go to STEP (S3C), otherwise go to STEP (S39).

STEP (S39): wait for finishing the decompression Di(k−1). If the value of the decompression completion flag Fd(k−1) becomes 1, then set the value to zero and go to STEP (S3A). It should be noted that when k=0, the value of k is considered to be 3 in Di(k−1) and Fd(k−1).

STEP (S3A): start the decompression Dik by the decompression unit 142. In this time, the content of the element i of the C-band arrangement 1330 as the top address of data to be decompressed and the content of the element k of the B-band arrangement 1332 as the top address of a decompressed data storing area are supplied to the decompression unit 142.

STEP (S3B): Upon occurrence of a process completion event of the decompression unit 142 started in STEP (S3A), in an event handler that receives the event, set the value of the decompression completion flag Fd(k) in FIG. 15 to 1, then go to STEP (S32).

STEP (S3C): increase i by 3, and reset j to zero.

STEP (S3D): if i>n, end the process; otherwise return to STEP (S31).

The others in Embodiment 3 are identical to those in Embodiment 1.

According to Embodiment 3, each of compression and decompression easily comes to be performed relatively continuously for three bands and consequently print data can be converted to bitmap data at high speed.

Further, since for one band, decompression, rasterization and compression are performed in one thread sequentially, synchronization among the processes of the decompression, the rasterization and the compression is not required between threads.

Furthermore, common functions can be used for the threads Th0A to Th2A, so that memory usage can be reduced more than that in case of Embodiment 1 or 2.

Furthermore, since display lists are generated in a thread different from the threads Th0A to Th2A, processes are performed efficiently due to a shorter delay than that in case of generating the display lists in each of the threads Th0A to Th2A.

Moreover, decompression and transfer of the page data may be controlled in another thread ThP. In this case, processes are performed efficiently due to a shorter delay than that in case of controlling decompression and transfer of the page data in each of the threads Th0A to Th2A.

Embodiment 4

Figure 17:
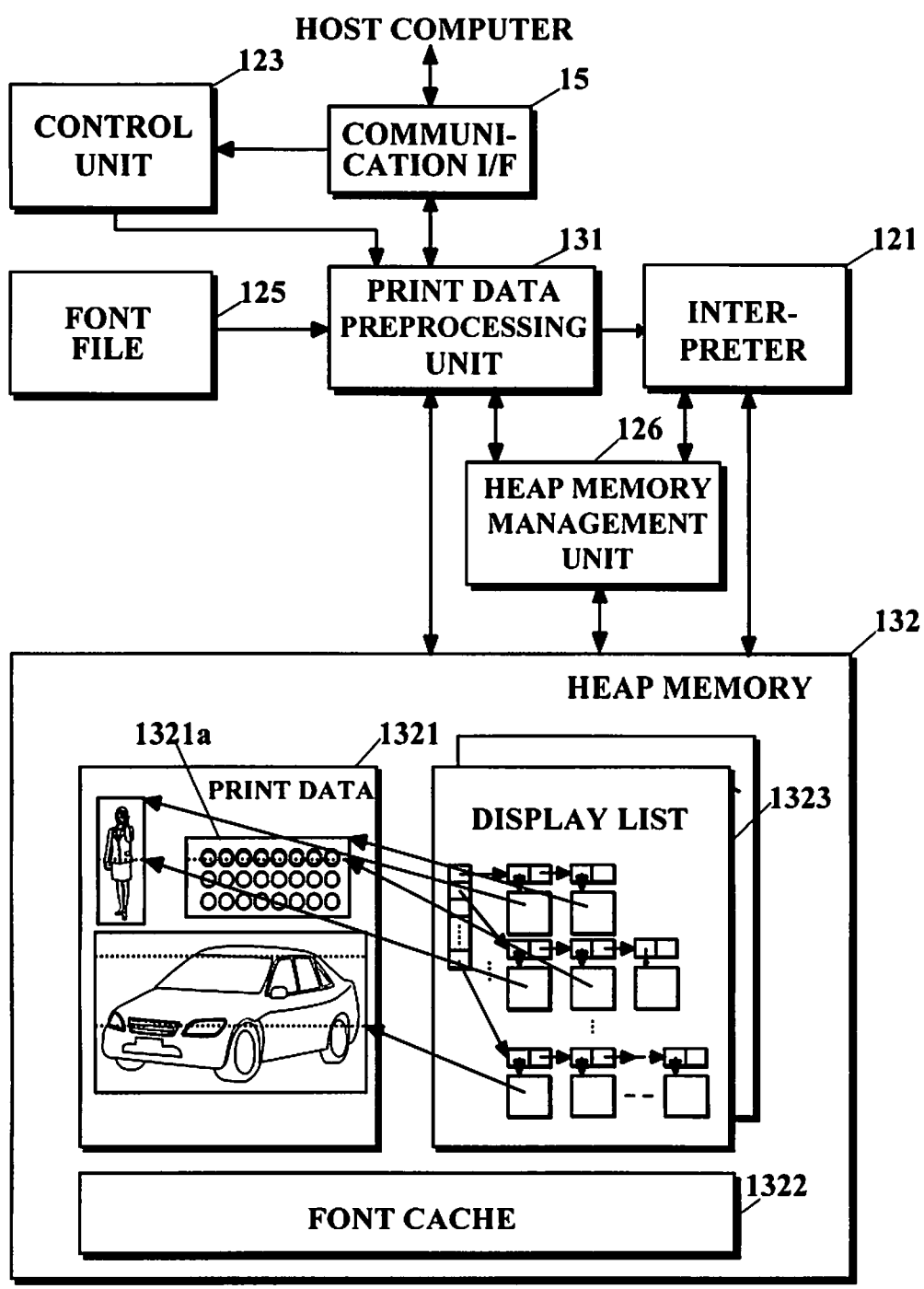
FIG. 17 is a function block diagram of the part that performs processes from receiving print data from a host computer to converting to an intermediate code.

FIG. 17 is a function block diagram of the part that performs processes from receiving print data from a host computer to converting to an intermediate code. The rasterization and processes after the rasterization are identical to those in FIG. 1.

In Embodiment 4, the control unit 123A generates a thread of a print data preprocessing unit 124 when receiving print data from a host computer via the communication interface 15. Upon this, the control unit 123A stores one page of the print data 1321 received via the communication interface 15 in the heap memory 132. The control unit 123A generates a thread of the print data preprocessing unit 124 every time when a page break command is received. The print data preprocessing unit 124 corresponds to a part of the control unit 123 in FIG. 1, and the control unit 123A in FIG. 17 corresponds to the part excluding the print data preprocessing unit 124 from the control unit 123 in FIG. 1.

In the EEPROM 12 (in FIG. 21), a font file 125 of a predetermined font has been stored, and if the font is used in the print data, the print data preprocessing unit 124 refers to the font file 125 and converts a series of character codes in the print data to a character string image 1321a. In this time, if a character image of the character code has been stored in a font cache 1322, this image is used; otherwise a character image is stored in the font cache 1322 after the character image is generated from the character code. The print data preprocessing unit 124 may convert figure objects to basic figures such as trapezoid to reduce processing time in the RIP 122 in FIG. 1.

The print data preprocessing unit 124 generates a thread of the interpreter 121 when starting receiving.

Upon generating the thread, the interpreter 121 performs the process mentioned in Embodiment 1 in parallel with the process in the print data preprocessing unit 124 to generate one page of the display list 1323 into the heap memory 132. The character string image 1321a is linked by a pointer in the display list 1323 as well as the image object in the print data 1321 (see Embodiment 1).

Each of the print data preprocessing unit 124 and the interpreter 121 allocates and releases areas in the heap memory 132 via the heap memory management unit 126.

Figure 18:
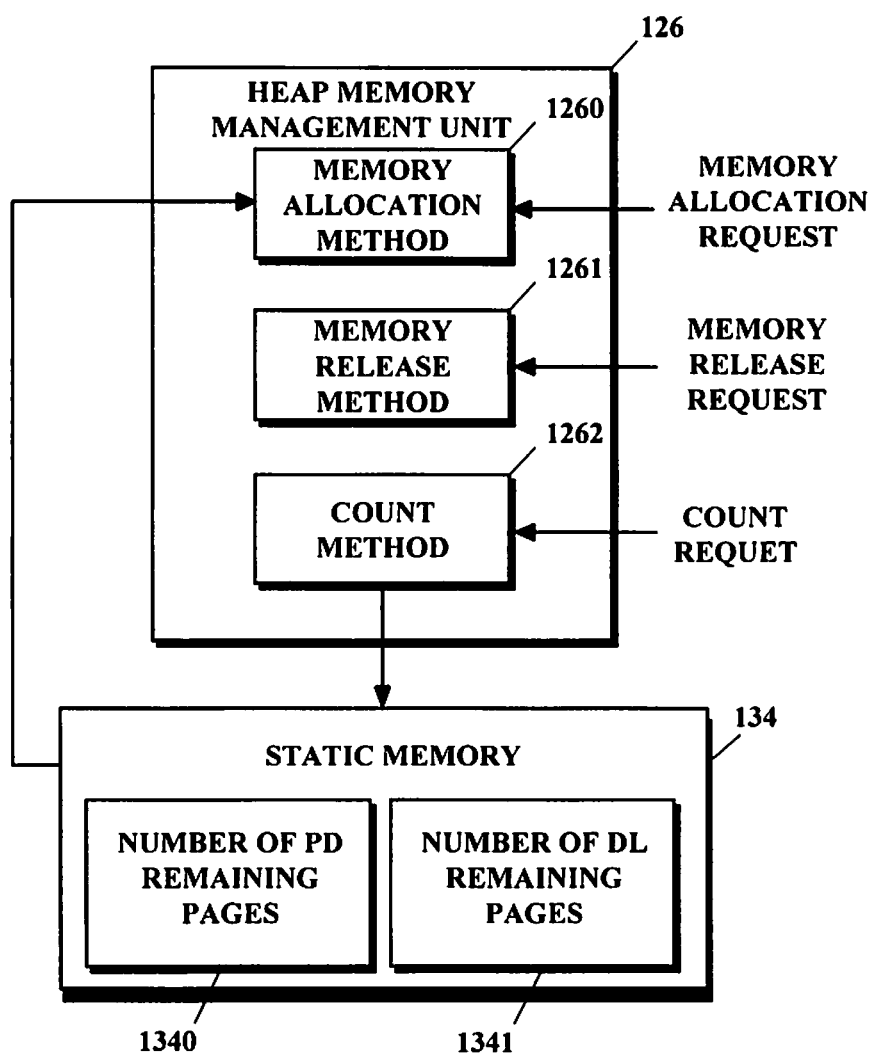
FIG. 18 is a block diagram of configuration of a heap memory management unit etc.

FIG. 18 is a block diagram of configuration of the heap memory management unit 126 etc.

The heap memory management unit 126 has a memory allocation method 1260, a memory release method 1261 and a count method 1262. The memory allocation method 1260 and the memory release method 1261 are executed in respective threads other than a thread of the print data preprocessing unit 124 or the interpreter 121. On the other hand, data 1340 and 1341 used in the heap memory management unit 126 are stored in a static memory 134 as a part area in the RAM 13, the data 1340 is the number of pages of print data remaining in the heap memory 132 and the data 1341 is the number of pages of a display list remaining in the heap memory 132. Here, the number of remaining pages means the number of pages including a page processed currently.

The initial value of the data 1340 is set to zero, and then the print data preprocessing unit 124 increases the value of the data 1340 by 1 via the count method 1262 every time when reading one page of the print data 1321 into the heap memory 132, and releases a page of the print data 1321 (except for the image linked from the display list 1323) from the memory upon receiving a release command specifying the page from the interpreter 121, and then decreases the value of the data 1340 by 1 via the count method 1262. The release command is supplied when the interpreter 121 finishes generating one page of the display list.

The initial value of the data 1341 is set to zero, and then the interpreter 121 increases the value of the data 1341 by 1 via the count method 1262 every time when generating one page of the display list 1323, and releases a page of the display list 1323 from the memory upon receiving a release command specifying the page from the RIP 122 in FIG. 1, and then decreases the value of the data 1341 by 1 via the count method 1262. The release command is supplied when the RIP 122 finishes rasterizing one page.

The memory allocation method 1260 invokes a garbage collector GC when determining, based on a predetermined condition mentioned below, that a required size of memory area will not be able to be allocated even after release by the memory release method 1261. The memory release method 1261 is executed in parallel with the memory allocation method 1260. The garbage collector GC may be a program in either the system side (i.e. runtime library) or the application side.

In conventional systems, without determining whether the condition is satisfied, a garbage collector GC is always invoked when it is determined that a required size of memory area can not be allocated, and consequently processes are delayed. However, in Embodiment 4, since the memory allocation is performed after the memory release if the condition is satisfied, frequency of invoking the garbage collector GC is reduced and thus a process delay due to executing the garbage collector GC is reduced.

In general, if another thread runs while the garbage collector GC is running, errors may be occurred in the garbage collection due to changing object references. Moreover, if data to be copied are changed during compaction, errors may be occurred in the copy.

Therefore, using binary semaphores in the OS, the garbage collector GC must be started after the threads using the heap memory 132 outside of the heap memory management unit 126 stop, that is, the threads of the print data preprocessing unit 124 and the interpreter 121 in Embodiment 4.

Figure 19:
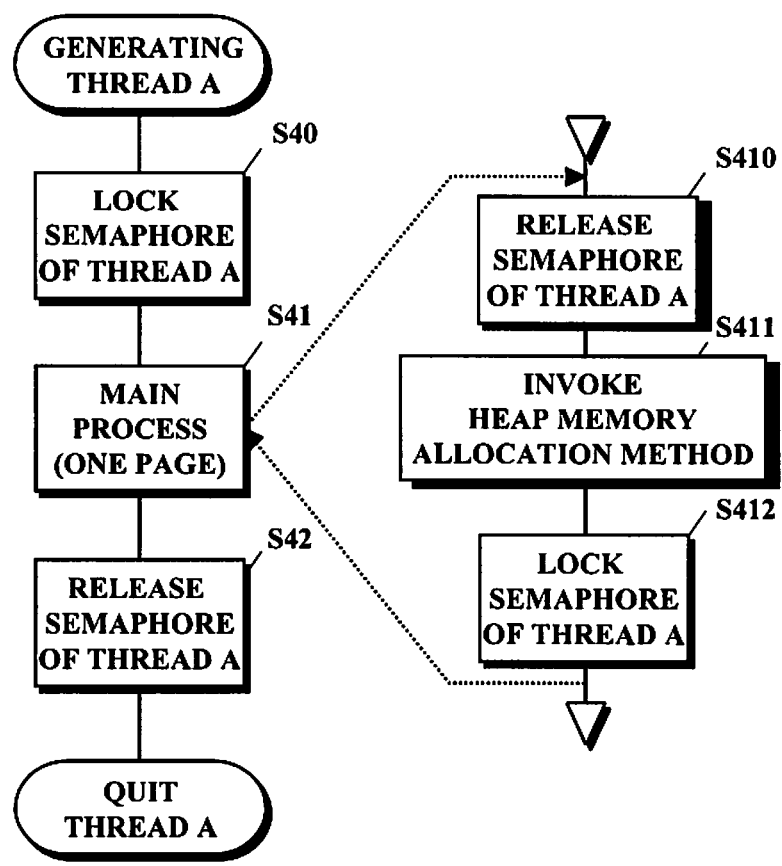
FIG. 19 is a flowchart that mainly explains lock and release of a semaphore in any of threads using heap memory except garbage collection.

FIG. 19 is a flowchart that mainly explains lock and release of a semaphore in any (Thread A) of threads outside of the heap memory management unit 126.

A semaphore of Thread A itself is locked in STEP (S40) as preprocessing of the main process (the process of one page) in STEP (S41), and the semaphore is released as postprocessing of STEP (S41).

Figure 20:
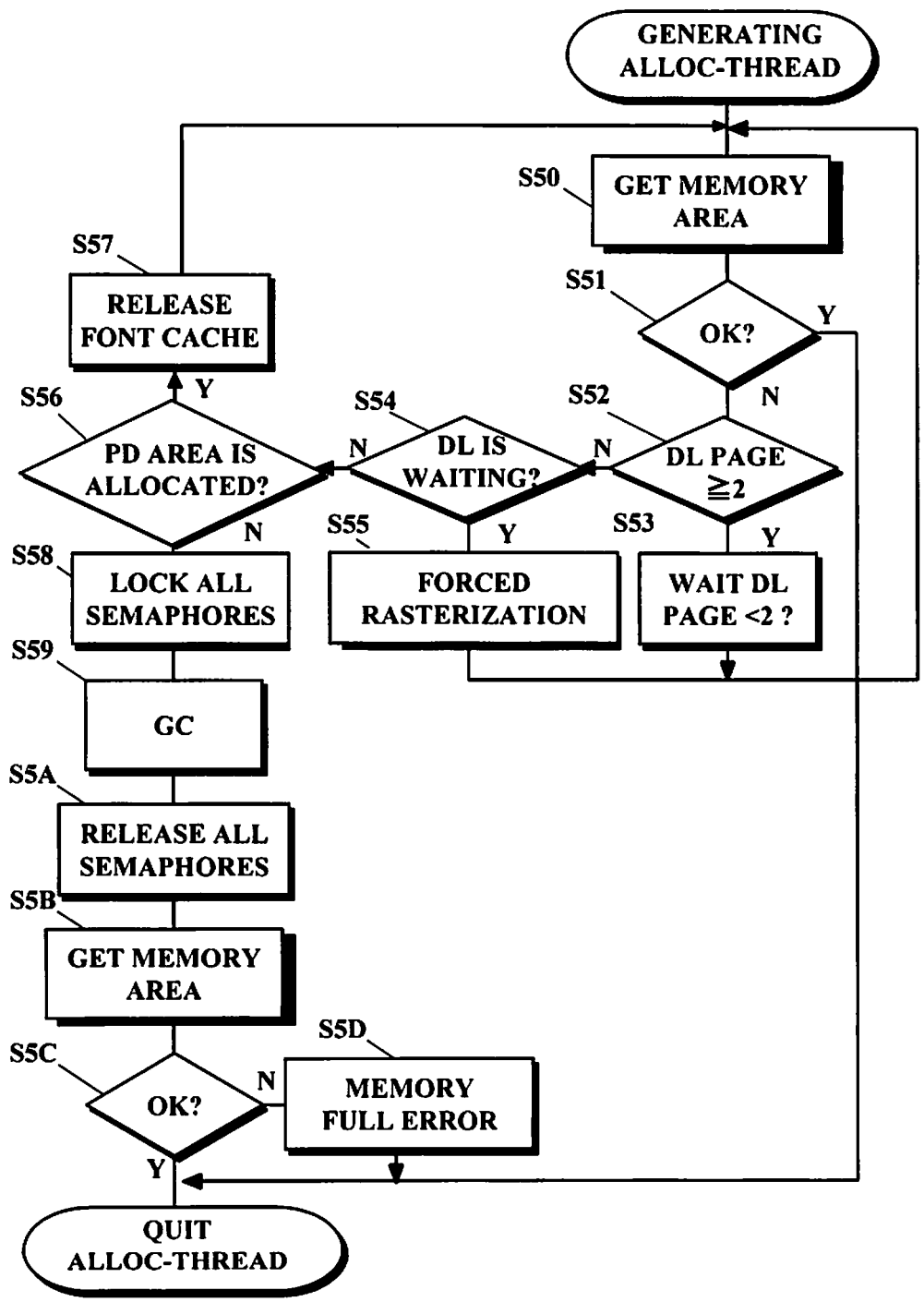
FIG. 20 is a flowchart that explains process of a memory allocation method in FIG. 18.

As a result, if the semaphore of Thread A has been locked when it is attempted to lock the semaphore before the garbage collector GC is invoked (i.e. in STEP (S58) of FIG. 20) in a thread of the memory allocation method 1260 (Thread B), then Thread B is queued by the OS and becomes in a wait status until the end of the process in STEP (S412).

Further, in STEP (S41), in case that the memory allocation method 1260 is called in STEP (S411), a semaphore of Thread A itself is released in STEP (S410) as preprocessing of it, and the semaphore is locked as postprocessing of STEP (S411).

Consequently, even if Thread A generates a thread of the memory allocation method 1260 (i.e. Thread B) and requests a memory allocation, Thread B can obtain the semaphore of Thread A before invoking the garbage collector GC (i.e. in STEP (S58) of FIG. 20), and therefore a dead lock between Thread A and Thread B is avoided.

FIG. 20 is a flowchart that explains process of the memory allocation method 1260. Thread B of this method is generated by either the print data preprocessing unit 124 or the interpreter 121 when either the print data preprocessing unit 124 or the interpreter 121 requests to allocate a heap memory.

STEP (S50): determine whether a required size of memory area can be allocated or not, and if it is determined that the required size of memory area can be allocated, then allocate the memory area.

STEP (S51): if the memory area was allocated successfully, then end the process in FIG. 20 (i.e. Thread B vanishes automatically), otherwise go to STEP (S52).

STEP (S52): if the value of the data 1341 is equal to or greater than 2, then go to STEP (S53) because it is estimated that one page of the display list 1323 is about to be released; otherwise go to STEP (S54).

STEP (S53): wait for occurring an event that the value of the data 1341 is decreased. Upon the occurring the event, go to STEP (S50).

STEP (S54): if the number of bands of the display list 1323 that have been generated (the number i) is less than a predetermined value it (i.e. a rasterization starting condition), then go to STEP (S55); otherwise go to STEP (S56). Here, if i=it, the process in FIG. 14 is started in principle to avoid waiting time in STEP (S32) of FIG. 14.

STEP (S55): In an exception of this principle, start the process in FIG. 14 and wait for releasing one page of the display list 1323 when the process in FIG. 14 is finished, then go to STEP (S50) after the release.

STEP (S56): if the memory allocation request is from the print date preprocessing unit 124, go to STEP (S57); otherwise go to STEP (S58).

STEP (S57): release the font file 125, and then go to STEP (S50). In this case, if in STEP (S51) it is determined again that the memory area was not allocated, go to STEP (S58) from STEP (S51). This procedure is not shown in FIG. 20.

STEP (S58): lock the semaphore of each of threads using the heap memory 132 outside of the heap memory management 126. If it can not be locked, then the thread (Thread B) is queued by the OS until it can be locked. In Embodiment 4, the memory allocation request is from the thread of one of the print data preprocessing unit 124 and the interpreter 121, the requester can lock the semaphore immediately by the process in STEP (S411), and consequently Thread B is queued by the OS until the thread of the other performs STEP (S42).

STEP (S59): invoke the garbage collector GC.

In case that the process of the interpreter 121 is finished in the wait status of STEP (S58), bands in the display list 1323 that have not been referred after the rasterization and image data in the print data 1321 linked to the bands are released by the garbage collector GC, and the released area in this time is relatively large. Therefore, a relatively large continuous area can be allocated by the garbage collection, and namely the garbage collection is performed effectively, and thus frequency of garbage collection can be reduced and consequently can be reduced a delay on heap memory allocation.

STEP (S5A): release the semaphores of the threads using the heap memory 132 outside of the heap memory management unit 126.

STEP (S5B): determine whether a required size of memory area can be allocated or not, and allocate it if it can be allocated.

STEPs (S5C and S5D): if it was not allocated in STEP (S5B), then abort the print job after causing the operation panel 20 to display a memory full error notice.

The description of the present invention has been presented for purposes of illustration and description, and is not intended to be exhaustive or limited to the invention in the form disclosed. Many modifications and variations will be apparent to those of ordinary skill in the art.

In the embodiments, the band-block number variable group 1333 may be updated before each of the processes such as rasterization and so on starts.

Further, synthesis of two bitmap data is performed by overwriting one bitmap data on another bitmap data in the embodiments, but the synthesis may be done by logical calculation of two bitmap data.

Furthermore, where multitask is achieved with multithread in the embodiments, multitask may be achieved with multiprocess.

Furthermore, a double core CPU may be used as the CPU 11, and the compression/decompression processor may be constituted by the one of the cores executing a compression/decompression program. If do so, the compression and the decompression are performed in multitask processing.

Furthermore, the memory allocation method 1260 may stop an active thread of the print data preprocessing unit 124 and/or the interpreter 121 and start the garbage collector GC without using semaphores because there are advantages in STEPS (S50) to (S57). Alternatively, without stopping the active thread, a known method may be used to correct an error when the error occurs.

Furthermore, the memory allocation method 1260 may be constituted without the process of STEPs (S52) to (S57) because there are also advantages in STEPs (S58) to (S5A).

Furthermore, where the main process in STEP (S411) is done for one page, the main process may be done for the predetermined amount such as a predetermined number of bands.

Furthermore, the print data preprocessing unit 124 and/or the interpreter 121 may be divided into a plural of functions, and the functions may be executed in respective threads.

What is claimed is:

1. An image forming apparatus comprising:
   a processor that executes a heap memory allocation program; and
   a memory unit that a heap memory is allocated to, the memory unit is connected to the processor,
   wherein the processor executes the heap memory allocation program to perform the steps of:
   (a) determining whether a required size of memory area can be allocated or not and allocating the required size of memory area if the memory area can be allocated;
   (b) when it is not determined that the memory area can be allocated, waiting for changing a status of the memory unit from a predetermined first status to a predetermined second status if a status of the memory unit is the first status and then performing the step (a) again when a status of the memory unit becomes the second status; and
   (c) in the step (b), if it is determined that a status of the memory unit is not the first status, allocating the required size of memory area after garbage collection is performed.

2. The image forming apparatus according to claim 1, wherein the first status is a status in which two or more pages of display list including a currently processed page remain on a memory, and the second status is a status in which only one or less page of display list including a currently processed page remains on a memory.

3. The image forming apparatus according to claim 2, wherein in the step (c), the processor performs the steps of:
   (c1) if a status of the memory unit is not the first status, determining whether only one or less page of display list including a currently processed page remains on a memory and the number of bands that have been generated of a display list currently processed is less than a value of a rasterization starting condition;

(c2) in the step (c1), if it is determined that only one or less page remains and the number of bands is less than the value, starting rasterization exceptionally and performing the step (a) again; and (c3) in the step (c1), if it is not determined that only one or less page remains and the number of bands is less than the value, allocating the required size of memory area after garbage collection is performed.

4. The image forming apparatus according to claim 3, wherein in the step (c3), the processor performs the steps of:

(c31) determining whether a request to allocate the memory area came from a program performing a process before generating the display list, and if it is determined that the request came from the program, releasing a font cache and performing the step (a) again;

(c32) in the step (c31), if it is not determined that the request came from the program, allocating the required size of memory area after garbage collection is performed.

5. An image forming apparatus comprising:

a processor that executes a heap memory management program and processing programs; and a memory unit that a heap memory is allocated to, the memory unit is connected to the processor, wherein the processing programs are executed in different respective tasks;

the heap memory management program has a heap memory allocation program executed in a task other than the tasks of the processing programs and a heap memory release program capable of being executed in parallel with the heap memory allocation program;

according to each of the processing programs, the processor locks a semaphore designated to a task of the processing program in preprocessing before executing the processing program and releases the semaphore in postprocessing after executing the processing program;

according to the heap memory allocation program, when the processor determines that a required size of memory area can not be allocated, the processor locks semaphores for the respective processing programs in preprocessing of garbage collection, then performs the garbage collection, and releases the semaphores in postprocessing of the garbage collection;

according to the heap memory release program, the processor releases a memory area in the heap memory, the memory area is assigned by a release request from one of the processing programs; and each of the processing programs releases the semaphore of itself before requesting heap memory allocation to the processor via the heap memory allocation program and locks the semaphore after executing the heap memory allocation program.

6. The image forming apparatus according claim 5, wherein according to the heap memory allocation program, when heap memory allocation is requested by one of the processing programs, the processor performs the steps of:

(a) determining whether a required size of memory area can be allocated or not and allocating the required size of memory area if the memory area can be allocated, and then ending the allocation process;

(b) if it is not determined that the memory area can be allocated, determining whether a status of the memory unit is a first status, the first status is a status in which it is expected that the required size of memory can be allocated in a second status after executing the heap memory release program;

(c) in the step (b), if it is determined that a status of the memory unit is the first status, waiting for changing a status of the memory unit to the second status and then performing the step (a) again when a status of the memory unit becomes the second status;

(d) in the step (b), if it is not determined that a status of the memory unit is the first status, performing garbage collection; and (e) allocating the required size of memory area after the garbage collection.

7. The image forming apparatus according to claim 6, wherein the first status in the step (b) is a status in which two or more pages of display list including a currently processed page remain on a memory, and the second status in the step (c) is a status in which only one or less page of display list including a currently processed page remains on a memory.

8. The image forming apparatus according to claim 7, wherein in the step (d), the processor performs the steps of:

(d1) if a status of the memory unit is not the first status, determining whether only one or less page of display list including a currently processed page remains on a memory and the number of bands that have been generated of a display list currently processed is less than a value of a rasterization starting condition;

(d2) in the step (d1), if it is determined that only one or less page remains and the number of bands is less than the value, performing the step (a) again after forced execution of a rasterization program; and (d3) in the step (d1), if it is not determined that only one or less page remains and the number of bands is less than the value, performing garbage collection.

9. The image forming apparatus according to claim 6, wherein according to the processing programs, the processor performs processes in a plural of tasks, the processes are generated by dividing a process in which received print data are stored in the heap memory and an intermediate code is stored in the heap memory after transforming the print data to the intermediate code.

10. The image forming apparatus according to claim 9, wherein the processing programs have a processing program storing received print data in the heap memory and a processing program storing an intermediate code in the heap memory after transforming the print data to the intermediate code.

* * * * *